US012375494B1

(12) United States Patent
Batchelor et al.

(10) Patent No.: US 12,375,494 B1
(45) Date of Patent: Jul. 29, 2025

(54) METHOD AND SYSTEM FOR MAKING IDENTITY DECISIONS

(71) Applicant: Verosint, Inc., Liberty Hill, TX (US)

(72) Inventors: Mark Batchelor, Lake Zurich, IL (US); Stephen Shoaff, Leander, TX (US); Sloan Childers, Puerto Vallarta (MX); John Fowler, Austin, TX (US); Travis Favaron, Austin, TX (US); Tim Fields, Georgetown, TX (US); Bo Li, Sugar Land, TX (US)

(73) Assignee: Verosint, Inc., Liberty Hill, TX (US)

( * ) Notice: Subject to any disclaimer, the term of this patent is extended or adjusted under 35 U.S.C. 154(b) by 180 days.

(21) Appl. No.: 18/201,162

(22) Filed: May 23, 2023

Related U.S. Application Data

(60) Provisional application No. 63/344,961, filed on May 23, 2022.

(51) Int. Cl.
*H04L 9/40* (2022.01)
(52) U.S. Cl.
CPC ............ *H04L 63/102* (2013.01); *H04L 63/20* (2013.01)
(58) Field of Classification Search
CPC .............................. H04L 63/102; H04L 63/20
USPC ........................................................... 726/1
See application file for complete search history.

(56) References Cited

U.S. PATENT DOCUMENTS

| | | | | |
|---|---|---|---|---|
| 8,572,391 | B2 * | 10/2013 | Golan | G06F 21/577 705/72 |
| 11,159,579 | B2 * | 10/2021 | Pentakota | H04M 15/50 |
| 2014/0289820 | A1 * | 9/2014 | Lindemann | G06F 21/32 726/5 |
| 2020/0412767 | A1 * | 12/2020 | Crabtree | H04L 63/1441 |
| 2021/0168148 | A1 * | 6/2021 | Boodaei | H04L 63/0861 |
| 2021/0243198 | A1 * | 8/2021 | Naumann zu Koenigsbrueck | H04L 63/10 |

* cited by examiner

*Primary Examiner* — Teshome Hailu
(74) *Attorney, Agent, or Firm* — J. Roger Williams, Jr.

(57) ABSTRACT

Disclosed are a method and computer system for quantifying identity risk associated with an agent's request for access to online resources using valid credentials of an authorized user. The likelihood that the agent is the authorized user is computed using access request data, historical access data for the authorized user, and identity risk signal data collected from open source intelligence (OSINT) and other external identity risk data sources. The likelihood may be based on the distance between the current digital fingerprint, which in an embodiment is a high-dimensional vector comprising identity risk signal data, and a similar historical digital fingerprint for the authorized user, or, alternatively, the deviation from mean between a current weighted risk score comprising the identity risk signal data and the historical weighted risk scores for the authorized user.

14 Claims, 15 Drawing Sheets

FIG. 11

METHOD AND SYSTEM FOR MAKING IDENTITY DECISIONS

The present application claims the priority of U.S. Provisional Application No. 63/344,961, filed May 23, 2022, which is hereby incorporated in its entirety.

FIELD OF THE INVENTION

The invention is in the field of computer network security. Embodiments particularly relate to computer systems and methods for authentication of access credentials submitted to gain access to an online resource.

BACKGROUND

An important goal of network security is to prevent hackers, fraudsters, or other bad actors from gaining unauthorized access to confidential sensitive information (e.g., personally identifiable information, trade secrets), causing the network to crash, or using the network to harm others. In some instances, conventional access credentials (e.g., user name, password) may be deemed to be "good enough." In general, however, conventional access credentials cannot be considered secure: they are vulnerable to dictionary based attacks, theft by social engineering, internal maliciousness, and bad actors can gain access to stolen credentials posted on the dark web. In other words, conventional access credentials can carry unacceptable levels of authentication risk (or identity risk), meaning risk that the agent using the credentials is not the same person that is authorized to use the credentials.

In other instances, additional active or interventionist measures can be taken to authenticate the agent or mitigate the risk that the user name and password have been compromised. Multi-factor authentication can tie an agent to a physical device which is helpful but defeatable. Challenge questions are another means of secondary authentication that may be insecure due to social engineering and public sources of information. Services such as Captcha use pattern recognition to determine that the agent is a human and not an automated process, but cannot identify the human. One-time PINS, authentication applications, and biometric sensors, dongles, and other physical devices provide enhanced authentication security but are not foolproof. Moreover, these active or interventionist authentication methods impose administrative and logistical burdens on companies that employ them and their authorized users. For a variety of reasons, these additional measures are not always necessary or desirable. Additional layers of security may make things harder for bad actors, but at the cost of increasing burdens, time delays, sapping productivity, and adding other sources of frustration that may deter authorized users from using them or using them as designed. Human-to-human interaction can be effective, but also adds delay, inefficiency, and unpredictability to authentication processes.

Multi-factor Authentication (MFA) methods exemplify the defects of conventional active authentication methods. A conventional MFA approach uses a time-based one-time password (TOTP). A TOTP, however, requires the selection of a specific device or phone number to serve as the additional authentication factor, which requires additional interaction from the end user in addition to the login form. In addition, a predetermined MFA method may not be suitable in every situation. In some cases it may impose unnecessary burdens on authorized users, while in other situations, for example, if a user's phone has been stolen, a predetermined MFA method may be insufficient.

In addition, the active authentication measures described above are poorly suited to other situations. In some situations, for example, continuous validation, or request for revalidation, may be important. Information about a compromised username may become available after someone has logged in with the compromised username. In the case of a paywall that regulates access to content, it may be valuable to continuously query whether a user remains authorized to access content behind the paywall.

For another example, financial institutions are required to perform some level of effort to know their customers (sometimes referred to as KYC) to prevent money laundering. Showing a digital image of a driver's license online and digital image of the person and comparing the two is an example of an active authentication approach used by financial institutions to implement KYC. This type of approach, however, requires sharing and/or storage of personally-identifiable information.

Active authentication measures are of no use in policing or preventing bad actors that use multiple usernames or accounts to access resources (for example, new user rewards), or bots and click farms that drive fake traffic to a website to increase click through rates and/or per click ad spend There is a need, in short, for a fully automated authentication process that does not require additional active or interventionist authentication techniques or tools.

In addition, different businesses may benefit from different automated authentication processes based on business logic unique to the business. The same authentication process that works for a clerk having to decide if a person should be granted access to a hotel room is not necessarily the best process for a bank that is required to use KYC. There is a need for user-configurable automated authentication processes.

SUMMARY

A computer-implemented method is provided for quantifying identity risk associated with a request for access to online resources. A request is received from a client for an identity likelihood. The request comprises risk indicia associated with an agent's request for access to online resources using valid credentials of an authorized user. The risk indicia comprises access data associated with the request for access, comprising first, second and third access request data attributes and user authentication data. In an embodiment, the first, second, and third access request data attributes comprise a telephone number, an email address, and an IP address. An authentication risk evaluation system is employed to use the risk indicia to compute a likelihood score and return it to the client. Employing an authentication risk evaluation system to use the risk indicia to compute a likelihood score comprises retrieving current identity risk signal data corresponding to the access request data attributes, including current first, second, and third identity risk signal data corresponding to the first, second, and third access request data attributes. User historical access data associated with the authorized user is retrieved. The likelihood that the agent is the authorized user is computed based on data comprising the current first, second and third identity risk signal data and the user historical access data.

A computer system is provided for quantifying identity risk for use in regulating access to online resources. The computer system comprises a client-facing server system programmed to receive from a client access request data associated with an agent's request for access to an online resource using valid credentials of an authorized user. The client-facing server system is also programmed to communicate to the client a computed likelihood that the agent is the authorized user. The computer system comprises a database system comprising user data comprising historical user access data associated with a plurality of user identities. The computer system further comprises a plurality of data signal collector systems communicatively linked to a plurality of external identity risk data sources, including at least one open source intelligence (OSINT) data source, and a graph database system comprising continuously and automatically-updated identity risk signal data sourced from the plurality of external identity risk data sources. The computer system further comprises a computer system programmed to compute the likelihood that the agent is the authorized user using data comprising the access request data, historical access data associated with the authorized user, and identity risk signal data.

In an embodiment, computing the likelihood that the agent is the authorized user comprises embedding identity risk signal data into a current digital fingerprint, retrieving historical digital fingerprints for the authorized user, and computing the distance between a similar historical digital fingerprint for the authorized user and the current digital fingerprint. In an embodiment, a digital fingerprint comprises a high-dimensional vector. In an alternate embodiment, computing the likelihood that the agent is the authorized user comprises computing a current weighted risk score comprising the identity risk signal data, retrieving historical weighted risk scores for the authorized user, and computing the deviation from mean between the current weighted risk score and the historical weighted risk scores for the authorized user. In an embodiment, computing the likelihood that the agent is the authorized user further comprises using client identity policy data, which in embodiments comprise a client-specified signal data source or a client-specified signal weighting.

DRAWINGS

The detailed description may refer to the following drawings, wherein:

FIG. 11 illustrates an exemplary user interface for revising signal weights.

DETAILED DESCRIPTION

Figure 1:
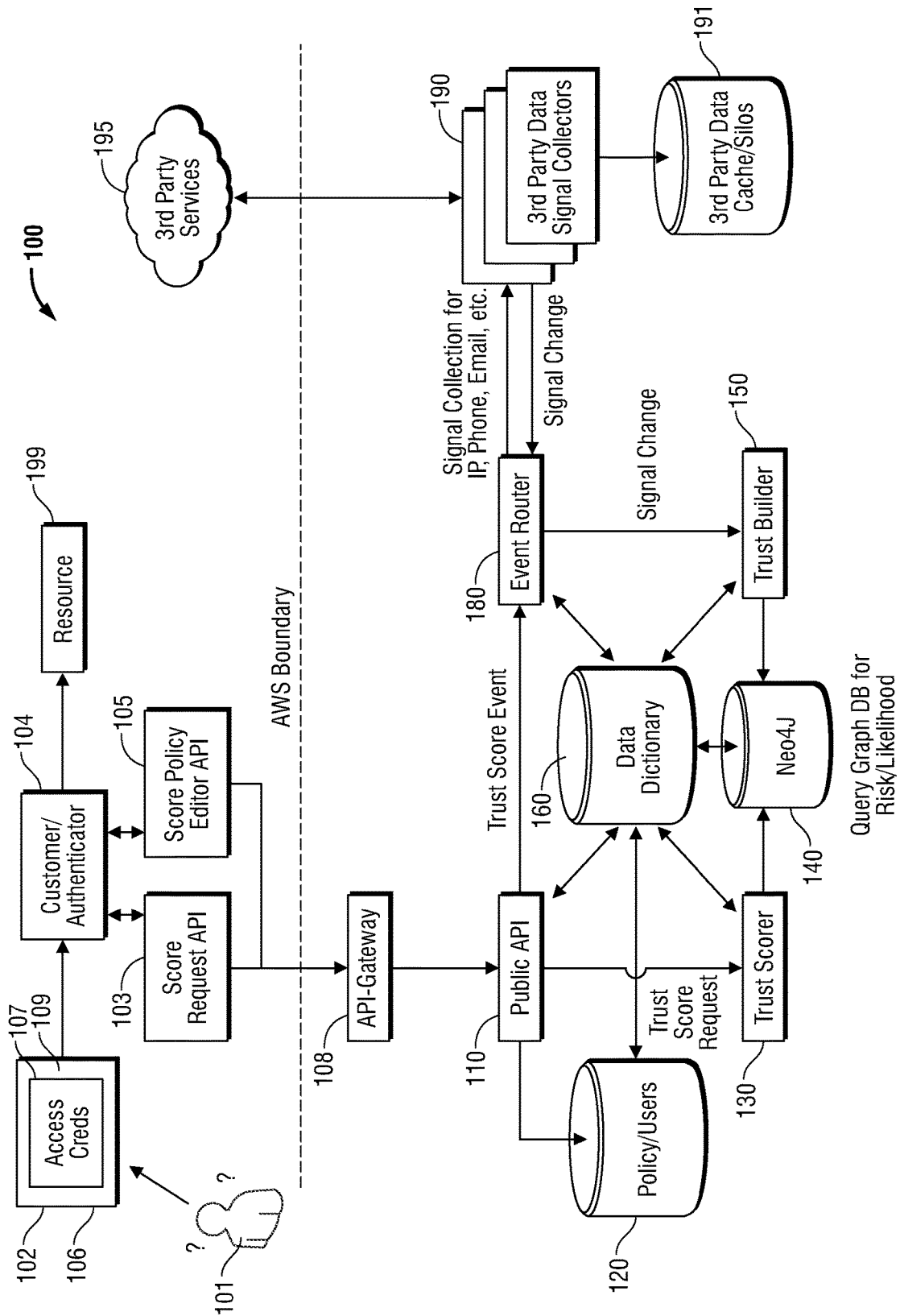
FIG. 1 illustrates a system diagram of an exemplary system for evaluating authentication risk associated with a request for access to an online resource.

Consider an agent who requests access to a controlled network or computer resource using valid access credentials associated with an authorized user of the resource. One of the problems in this scenario is authentication: How does the resource manager know that the agent requesting access is, in fact, the authorized user associated with the credentials? The problems of identifying and quantifying authentication risk (or identity risk) are technological problems in the field of protecting the security of online networks.

A dynamic digital fingerprint is a set of snapshots or signal points over time that can be correlated to authentication risk. Over time, we collect more signal points and associate or disassociate them with a particular identity to increase the quality of the dynamic digital fingerprint. Each time we see an identity, we compare the current digital fingerprint and the relationships to the historical digital fingerprint to identify changes over time that may affect the score of the identity. With each subsequent comparison, we can provide higher confidence in a positive recognition of an identity.

Described herein are embodiments of an authentication risk evaluation system, or a system to evaluate and/or quantify authentication risk or identity risk.

In an embodiment, we use tunable (or configurable) weights on algorithms to get consensus amongst many signal or data sources. Tuning and weighting are synonyms in this description. In embodiments, clients (or customers) can interact with the scoring algorithm by determining the weight of signals and how they relate to each other. This allows the client to decide for itself the importance of an individual signal or data source and match it to its business and user base. This is useful because an individual signal is not inherently "bad" or "good"—it all depends on the situation. For example, a content website that shows different content by region based on contractual agreements may find users who are using VPNs to be "risky". Differently, a corporation's intranet may want to highly value users who are on a VPN and classify as risky those who are not. This system also allows a customer to have employ multiple different signals, which can be weighted or varied over time as dictated by the customer's business needs.

In an embodiment, a dynamic digital fingerprint (DDF) is based on a set of signals in a constellation so to speak, a known pattern in a known location. A dynamic digital fingerprint can be created using a set of slices/snapshots/deltas of the risk and likelihood signals and trends that are monitored for changes over time. Signals have default and client configurable weights that can be tracked over time to increase the trust in a particular signal. The life cycle of a signal is tunable so that data that is no longer useful can be disposed of or weighted less in the decision making process. Adding new signals over time will change the DDF. A master digital fingerprint is established to be used as a baseline. The master digital fingerprint is updated with new data, as it becomes available. These changes can be used for continuous monitoring of the digital fingerprint.

In an alternative embodiment, an authentication risk evaluation system embeds access request data or data attributes and external risk signal data in a "digital fingerprint" format that can be compared to historical digital fingerprints for the same user identity to generate a likelihood score.

FIG. 1 illustrates a system diagram of an exemplary embodiment of an authentication risk evaluation system 100. In an embodiment, system 100 is implemented as a microservices platform. System 100 includes servers or virtual servers configured to provide a public applications programming interface 110, including an API Gateway 108, resting API 103 for providing a Likelihood (or risk score), and resting score policy API 105 for client configuration of score policy data, including risk score weight sets. In an embodiment API 103 and 105 are hosted on a network server accessible via the internet or other public communications network. In another embodiment API 103 and 105 are hosted on a server internal to an intranet or other private network.

API 103 fields requests from a client of the system, an authenticator 104. Authenticator 104 includes or employs a computer-implemented authentication system that controls authorized access to resource 199. For example, the resource may be an online banking system of a bank, and the Authenticator may be the authentication software and protocols implemented by the bank.

In a common use case, authenticator 104 has received a request for access 102 to Resource 199 from an agent 101. The request for access 102 includes access request data (or context data), including one or more items of user authentication data 106, including access credentials 107 (for example, user name, password, PIN) and other authenticating data provided by the agent or otherwise present in the request for access, for example, email address, phone number, account number, street address, city, state, zip code. Some user authentication data can be used be correlated to one or more user identities. The access request data also includes metadata 109 associated with the request for access 102, for example, an IP address ("ip"), domain, VPN information, or phone number. The metadata 109 may be included within the user authentication data 106. Some of these items or types of access request data can be correlated to a quantifiable level of authentication risk and may be referred to as risk indicia or authentication risk data. In an embodiment, authentication risk data used by system 100 includes IP address, email address, and phone number. The access credentials preferably correspond to the access credentials of an authorized user, a user who is currently authorized to access online resource 199.

Authenticator 104 may submit a score request to system 100 via API 103 comprising one or more items of risk indicia or authentication risk data to receive a likelihood determination that agent 101 is the authorized user, i.e., the user that is authorized to access resource 199 using valid access credentials 107. In an embodiment, the likelihood determination is expressed as a likelihood score. In an embodiment, the likelihood score is a number from 0 to 1, with 1 meaning highly likely.

System 100 includes a database 120 for user data, including user identity data, user authentication data, and historical data relating to previous access requests by the same user identity. In an embodiment, database system 129 also stores client policy data. In an embodiment, database 120 shares data and relationships with data dictionary 160. System 100 also includes a query graph database 140 for storing signal data and relationships used in calculating risk and likelihood scores. In an embodiment, query graph database 140 shares data and relationships with data dictionary 160.

Trust Scorer 130 receives requests for a likelihood score from authenticator 104 via API 110. In an embodiment, a request may contain an ip, email, domain, phone, or some combination of those. Based on the specified risk items, and using the data and relationships in data dictionary 160, Trust Scorer 130 will make a series of queries to graph database 140 and use the result of those queries to calculate risk scores. In an embodiment, a query looks at the information known for each of the risk items, e.g., fraud ratings from outside sources or presence on a list of known bad actors. For example, one query will check for an ip's presence on a list of known VPNs, while another query will retrieve that same ip's fraud ratings from an outside source. These searches retrieve binary or numeric values that are then consumed as raw signals or risk signals in the calculation of a risk score. A query may also look for a connections to other items that may have relevant information. For example, one query will look for information known about the internet domain of a requested email. In addition, again using the data and relationships in data dictionary 160, Trust scorer 130 also computes likelihood scores.

Trust Builder module 150 receives messages from event router 180 that contain information pertaining to known or potential risk factors for a specified risk item (e.g., ip, email, domain, or phone). Trust Builder 150 also pulls, retrieves, and receives new and revised signal data from third-party data signal collectors 190. Using the data and relationships in data dictionary 160, trust builder 150 stores this information to graph database 140, building relationships with data already in the graph database that is relevant to risk or likelihood. In an embodiment, Trust Builder takes a signal as an input event and using data dictionary 160 automatically creates the necessary relationships to insert the data item/signal into the graph for use in future risk or likelihood scores.

Data dictionary 160 keeps track of all the data item definitions, sources, raw signal names and types, risk signal names and types, categories, default weights, relationships, and metadata associated with the data stored in query graph database 140, client policy data base 120, third-party data signal collectors 190 and 3rd party data cache 191, and the like. In an embodiment, data dictionary 160 is hosted in a Postgres relational database management system. In an embodiment, data dictionary 160 is hosted in the same dataset instance as dataset 120.

Figure 10:
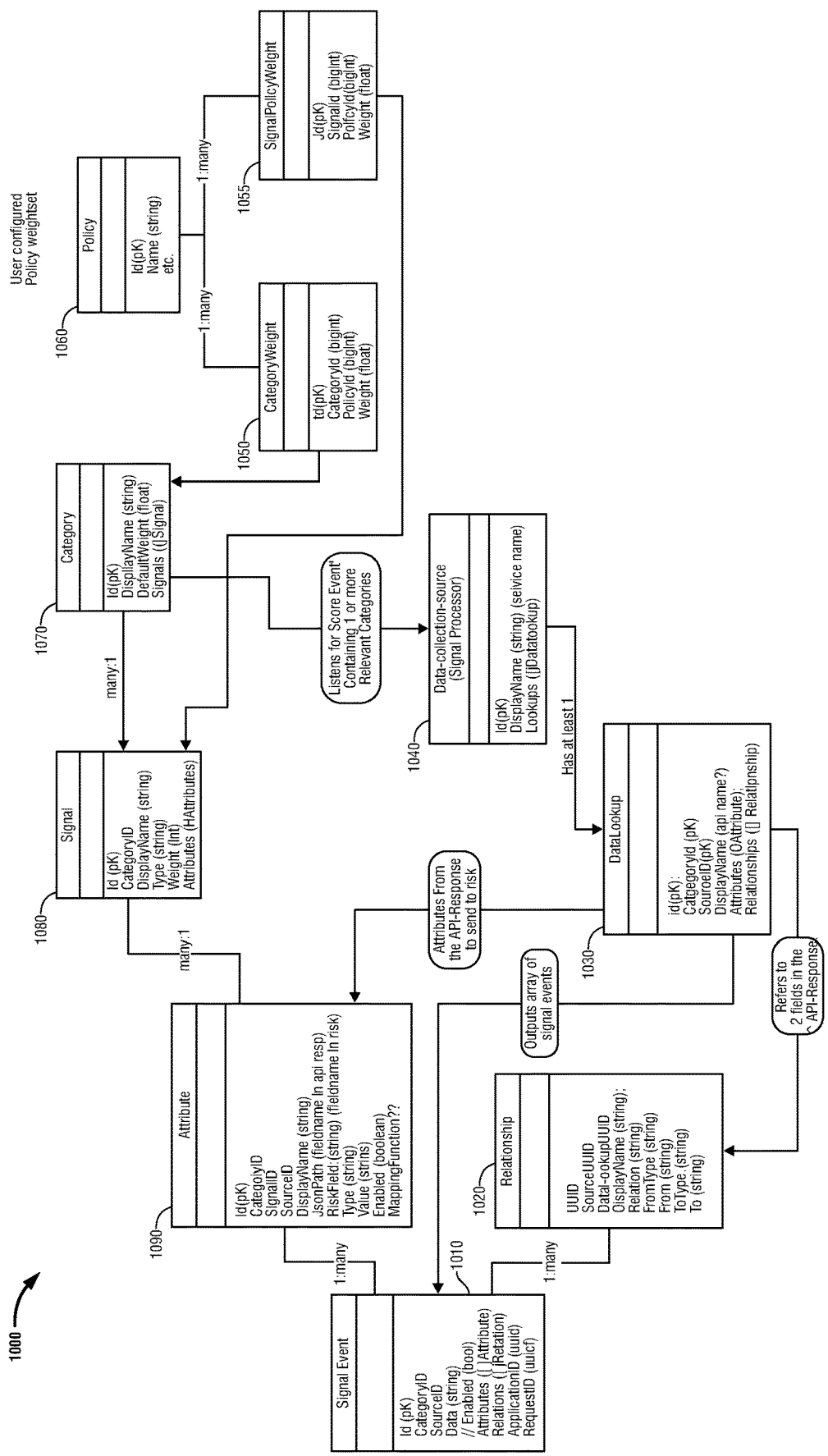
FIG. 10 illustrates an exemplary schema for an exemplary data dictionary.

FIG. 10 illustrates an exemplary schema 1000 for an exemplary embodiment of a data dictionary and the specific data stored within each table. In embodiments, the data dictionary holds data relating to signal level generic events, score output display strings, and user interface display strings; it can be used to add a new data source internally, add a new BYOD (client-specified) data source, auto-create Neo4J (graph query database) connections on a first signal event, and enable historical signal reporting by an application or client; and it supports a user interface to add RawSignals, Signal Categories and Sources and Default-Weight tuning. Additional details about each table in schema 1000 are provided below.

Table 1010 stores Signal Event data. In an embodiment, after processing a data lookup a signal processor will use its configuration from the data dictionary to output a standardized signal event containing all of the request metadata as well as all of the attributes and relationships from processing the lookup.

Table 1020 stores Relationship data. In an embodiment, a relationship is defined in the data dictionary and contains the instructions to create a link between two entities in the graph database.

Table 1030 stores DataLookup data, which includes in an embodiment one or more of the specific data retrieval paths inside of a signal processor that will use its configuration from that data dictionary to produce signal events. A DataLookup outputs an array of Signal events.

Table 1040 stores Data-Collection-Source (Signal Processor) data, which in an embodiment refers to a data collection microservice and can be something that accesses an internal database or external API. It listens for score events containing one or more relevant categories.

Table 1060 stores Policy Table data, which in an embodiment stores the client-configured policy weight set and links to Category Weight Table 1050 and SignalPolicy Weight Table 1055, which hold data describing the weight to be applied to specific categories and signals.

Table 1070 stores Category data. In an embodiment, Category data is a generalized type of data that encompasses multiple more specific signal types.

Table 1080 stores Signal data, which in an embodiment is a "sub-category" that represents a more specific aspect of its parent category.

Table 1090 stores Attribute data. An attribute is one specific data point that contributes to the evaluation of a signal.

In an embodiment, data dictionary 160 provides a single source of truth that gives clients the ability to scale/expand into any new direction or available market quickly without modifying their existing authentication infrastructure as well as to make new connections on existing data and use that data and connections to dynamically generate highly optimized/specific score evaluations for any potential use case. It allows clients to move significantly faster moving forward to add new connections to the scoring formula and also provides the ability to add/subtract/modify individual pieces of the system in order to rapidly iterate and prototype new formulas, user data and data connections without the need to redeploy code to try new ideas.

In an embodiment, a client will have access to a private area of the data dictionary as part of a "bring your own data" model which allows them to use their proprietary data as part of our scoring algorithms and allows us to be configuration-driven. The ability to add new data sources without writing any code is the goal. The data dictionary allows a client to define what types of data they will be adding as well as configure how that data or relationships between data points will contribute to the score evaluation. For example, a customer may have its own list of users that are on a watch list. The first step is to provide an API to enable our system to access the customer data set in a way that allows us to use it without writing any code or changing our graph traversal algorithms. The second step is to define the data items, sources, signal name, data type, and the like and enable the data collection in the data dictionary. In an embodiment a user interface will be provided with appropriate permissions so the client cannot work outside their own sandbox. Once the new signals are enabled in the dictionary, the data source will be automatically included in the data collection process for this customer only, unless they have allowed us to share the intelligence with other customers, it will automatically show up in the graph database and automatically be used for scoring for that specific customer. Or a client can just provide extra fields in the score request payload that can also be configured in the data-dictionary.

An authenticator or other client of the system can interact directly with the data dictionary to drive the data collection and scoring system by for example modifying weights, adding new data collection items, changing display names, and the like).

The data dictionary facilitates a customer BYOD (bring your own data) model by allowing clients to bring their own data they can input their existing customer data into their scoring formula and further customize and tune their KYC process and further customize and tune their identity decision-making process to their specific needs/situation.

Figure 8:
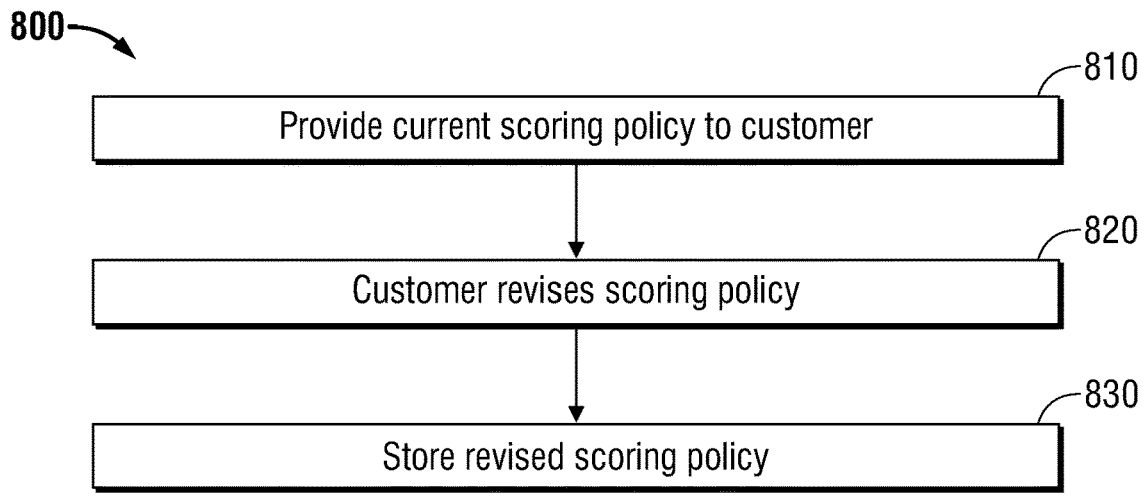
FIG. 8 illustrates an exemplary method of configuring policy score data.

In an embodiment, a customer or client can configure data sources or configure a policy score. Configuring a policy score, in an embodiment, means configuring a weight set for a particular policy. For example, a policy for registrations might be less stringent than a policy for a login. A customer may allow registrations from only one country but logins from any country once the account is established. FIG. 8 illustrates an exemplary method of configuring policy score data.

FIG. 8 illustrates an exemplary embodiment of a method by which a customer can configure a policy score. In step 810, the customer requests and is provided with the current policy score data. The current policy score data is stored in data dictionary 160 and can be retrieved via calls to API 110.

Figure 11:
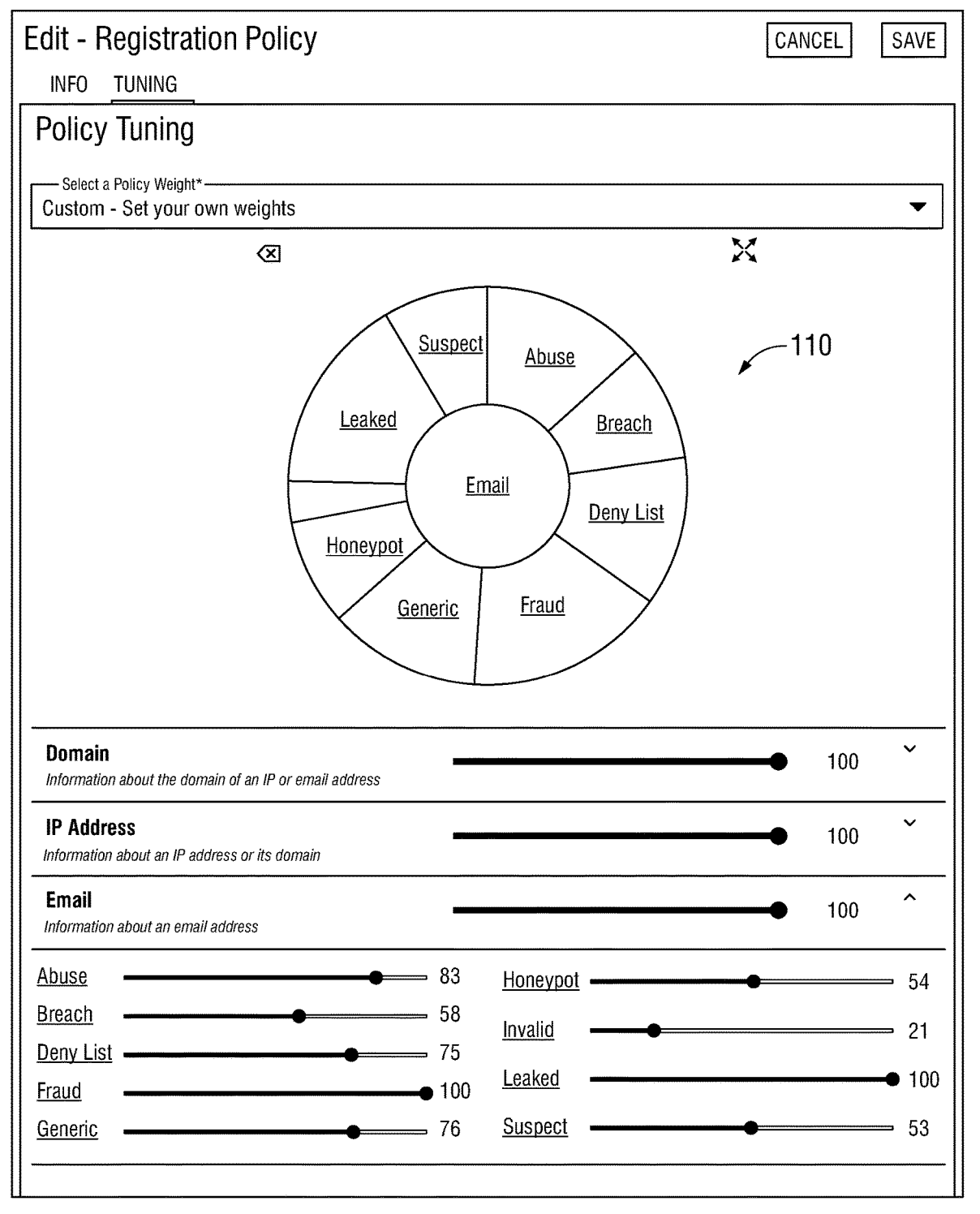

In step 820, the customer revises the scoring policy. The screen shot shown in FIG. 11 illustrates an exemplary user interface 1100 that enables a client to interact with data dictionary 160 to override default weight values for different risk categories of risk signal (domain, ip, email) and default weight values for specific risk signal components of the email signal category. For example, as illustrated in FIG. 11, a consumer of a risk score may determine that access should never be granted to an identity with an email address flagged as fraudulent. In this case they can override the weight of a fraud-type email signal to force a very high risk score. For another example, not illustrated in FIG. 11, a client may determine that access should never be granted to an identity from a tor network node. In this case, the client could override the weight of a tor node (within the category of ip signals) to force a 100% risk score. A similar user interface can be used to manage and assign weights for client-specific data sources, raw signals, and risk signals, and define and manage client-specific processes for computing risk scores or likelihood scores. In step 830, the revised policy score is stored in the data dictionary.

The ability to use tunable weights to get consensus amongst many signal sources is a powerful feature. This feature allows the customer or client to: (1) weight signal categories differently based on its industry; (2) weight signal categories differently based on the user base; (3) determine how risk averse it is vs taking on the risk tolerance of its risk vendor; (4) assign different weights for different risk situations (e.g., registration vs login); (5) monitor and evaluate multiple facets of risk without having to put them in a "stack-ranked" order to be evaluated serially.

Returning to FIG. 1, system 100 includes at least one, and preferably many, 3rd Party Data Signal Collectors 190. 3rd Party Data Signal Collectors 190 are configured to pull, retrieve, and/or receive pushed data from one or more external data services (including third-party services) 195.

Event router 180 sends or pushes the new or revised signal data to graph query database 140 and updates data dictionary 160. Exemplary third party data sources includes Kickfire, API Void, and IPQS. The third-party data is cached in one or more data cache/silos 191. Signal collectors 190 can also be used to collect customer proprietary signal data and save it in data cache/silos 191.

Figure 2:
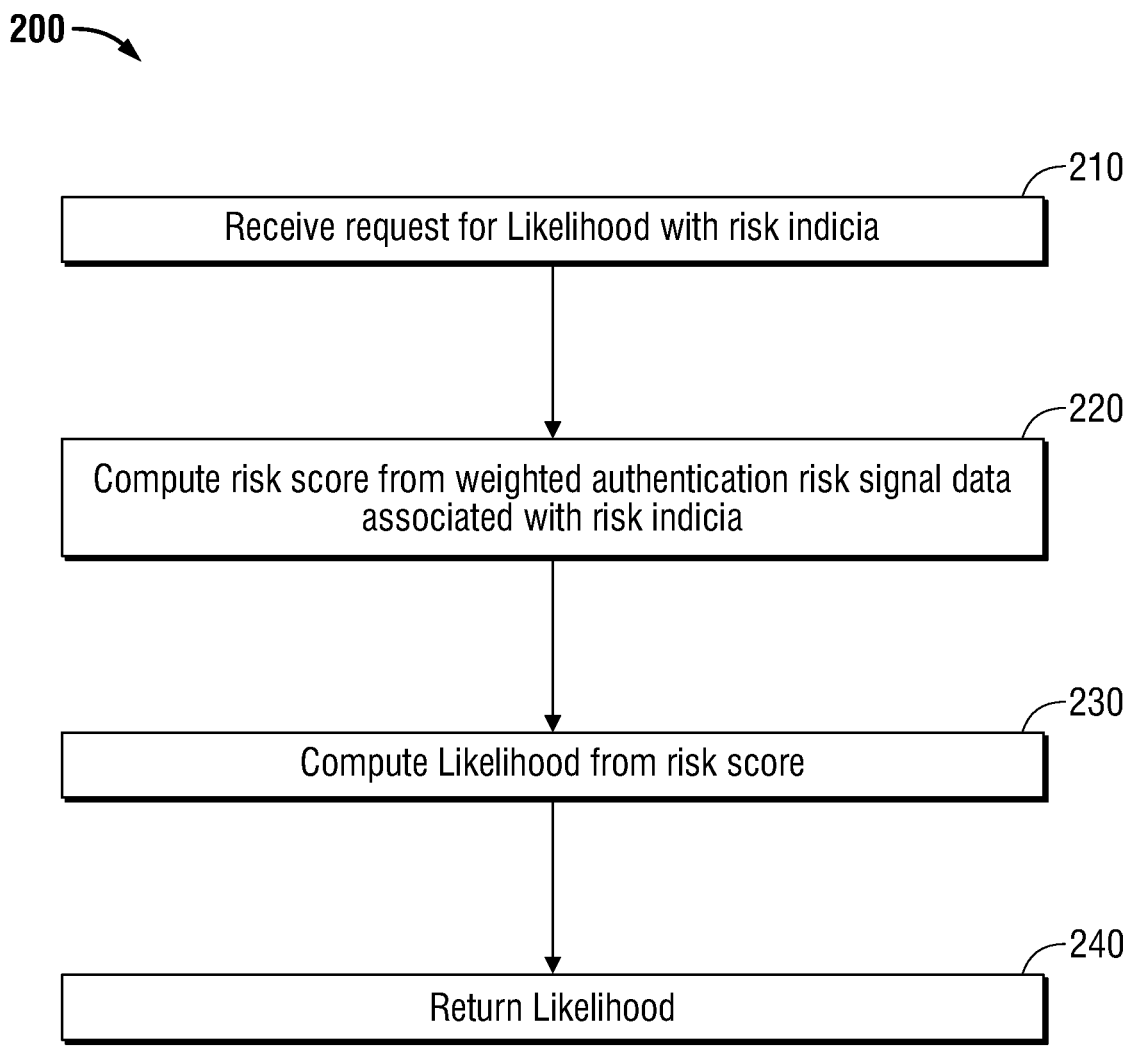
FIG. 2 illustrates an exemplary method of computing a likelihood score.

With FIG. 1, FIG. 2 illustrates an exemplary embodiment of a method 200 of computing a likelihood score (or Likelihood). In step 210, an authenticator 104 submits a request for a likelihood, or score request, related to or triggered by an agent request for access 106. In an embodiment, the score request is submitted via API 103. The score request includes one or more risk items (e.g., ip, phone, email, domain) supplied with the user authentication data 102. In step 220, a weighted risk score is computed based on the one or more risk items. In an embodiment, the weighted risk score is computed using risk signal data and configurable signal weight values maintained in graph query database 140 and data dictionary 160. In step 230, a likelihood score is computed based on the weighted risk score and other data, for example, data maintained in graph query database 140 and data dictionary 160. In step 240, the likelihood score is returned to the authenticator. These steps are explained in more detail below.

FIGS. 3A-3C, 4, 5A-5C, and 6 illustrate different aspects of exemplary computation of raw risk scores based on authentication risk data in an embodiment.

In the embodiments discussed herein, a data item refers to a single piece of data such as a Boolean or integer value representing a single decision making point. A data source refers to a source of data. Exemplary data sources can include proprietary data, third-party data, OSINT (open source intelligence) data, and customer proprietary data. A signal refers to a data attribute. A raw signal is made up of a single data item from a single data source, and is the base input for making a risk, likelihood, or dynamic fingerprint score. A risk signal can be a raw signal, or an aggregation of raw signals, that produce a single output. Each risk signal has a default weight which can be overridden by a customer. Use of risk signals obfuscates the raw signals from the customer so that the customer can dynamically change from one data source to another without interruption. A category (or signal category) is made up of one or more risk signals. Each category has a default weight which can be overridden by a customer. A risk score is calculated using many raw signals across one or more categories. It is a snapshot of the current intelligence we have on an identity and can be used to determine whether or not an identity which is trying to gain access to a resource should be trusted or not guiding further automated decisions. A policy refers to a weight set used in calculating a weighted risk score.

Figure 3A:
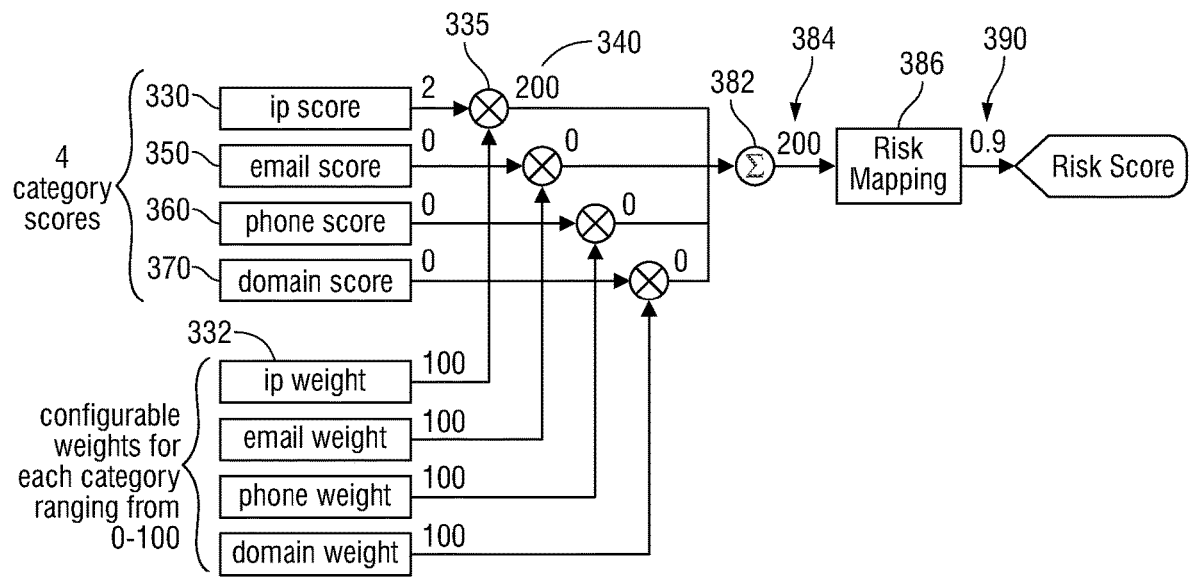
FIG. 3A illustrates an exemplary aggregation of category scores in an exemplary computation of a raw risk score.

FIG. 3A illustrates an exemplary aggregation of category scores in an exemplary computation of a raw risk score. In an embodiment, a raw risk score 390 is computed by aggregating four weighted category signal scores, ip score 330, email score, 350, phone score 360, and domain score 370.

Figure 3B:
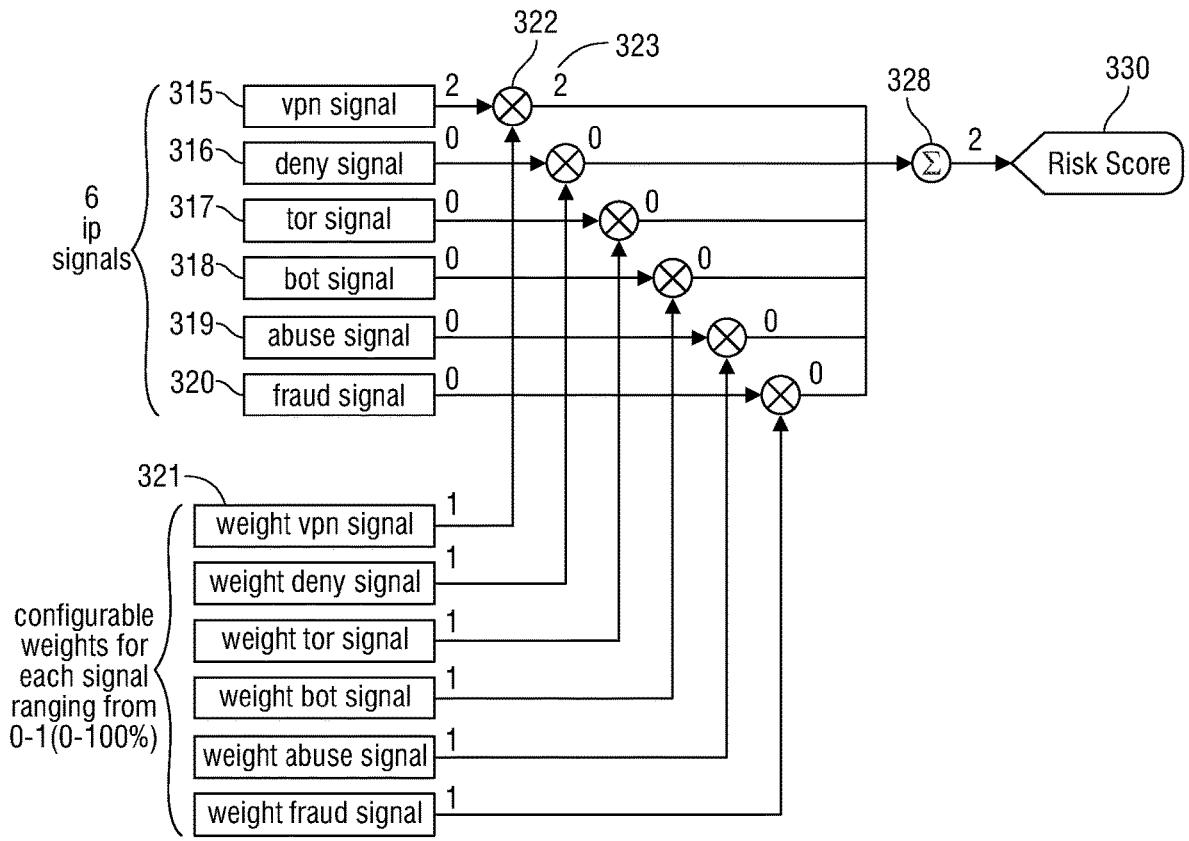
FIG. 3B illustrates an exemplary aggregation of weighted risk signals.

Each category signal score is computed by aggregating one or more weighted signal risk scores. FIG. 3B illustrates an exemplary aggregation of weighted risk signal scores to create the ip score 330. In an embodiment, the risk signals that are weighted and aggregated to form ip score 330 include vpn signal 315, deny signal 316, tor signal 317, bot signal 318, abuse signal 319, and fraud signal 320. The signals vpn, deny, tor, bot, and abuse represent instances of a given ip being reported as being from a vpn, on an outside 'deny' list, a tor node, a bot, or known abusive behavior, respectively. The fraud score signal is a numeric value representing the fraud potential of the given ip as reported by or based on information provided by external sources, client sources, or system administration.

Figure 3C:
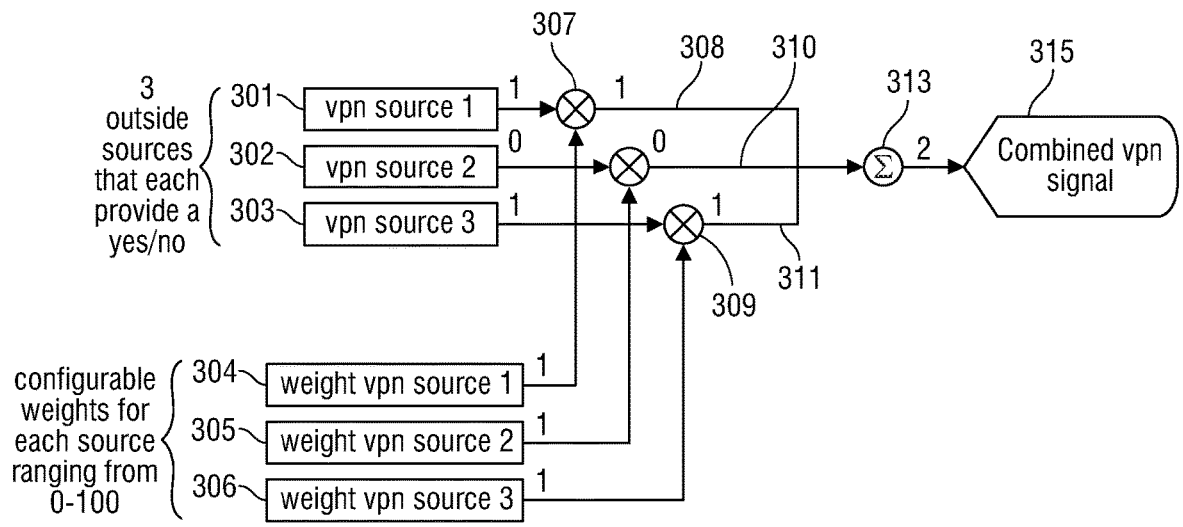
FIG. 3C illustrates an exemplary processing of raw binary signals to create an exemplary risk signal score.
Figure 4:
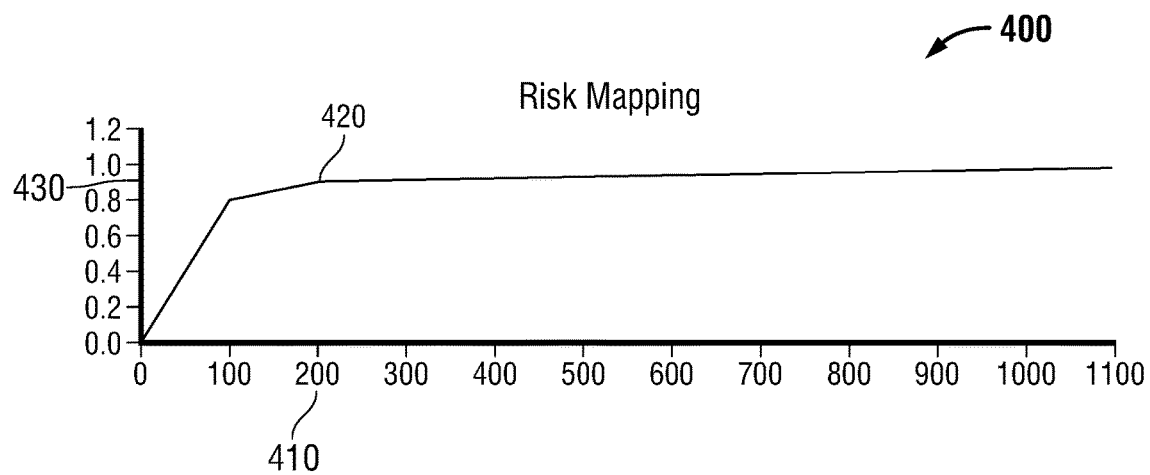
FIG. 4 illustrates an exemplary risk mapping curve.

Some of the risk signals may correspond to a single raw signal. For example, the "tor" risk signal 317 indicates that the ip address is operating from a tor node. Other risk signals may be computed by processing one or more raw signals. FIG. 3C illustrates an exemplary processing of raw signals to create an exemplary vpn signal risk score 315. In this example, vpn signal risk score 315 is computed by aggregating raw binary signals from vpn source 1 (301), vpn source 2 (302), and vpn source 3 (303). An OSINT data source can be used as a data source for raw signals.

Figure 6:
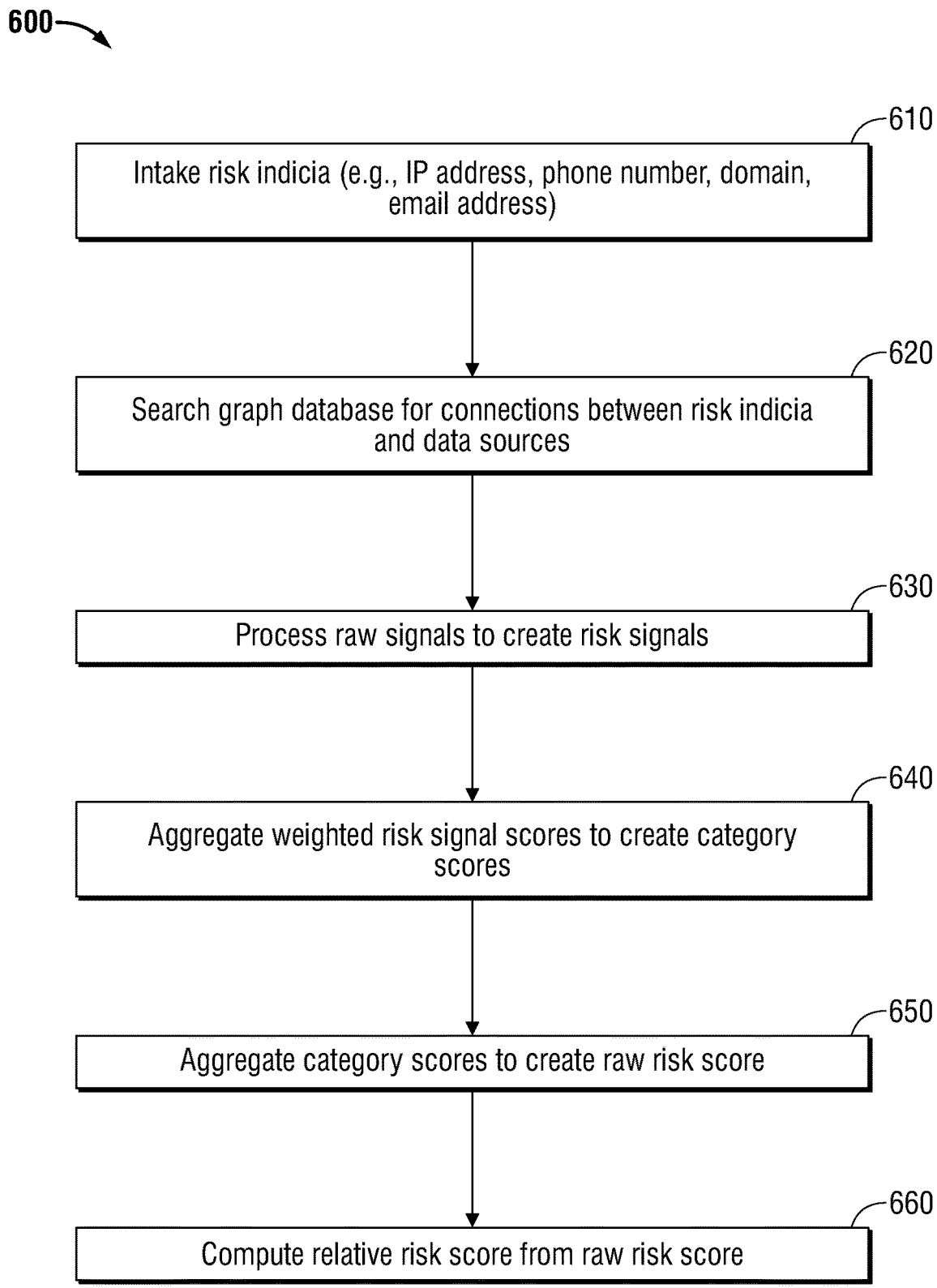
FIG. 6 illustrates an exemplary method of computing a weighted risk score.

FIGS. 3A, 3B, and 3C, with FIG. 6, illustrate an exemplary method of computing a weighted risk score based on vpn risk signal score. In step 610, the system is presented with risk authentication data. In this example, the system is presented with an IP address. In step 620 the risk score process searches the graph database for connections between the given IP address and the available data sources relevant to IP addresses. In the examples shown in FIGS. 3A, 3B, and 3C, the queries find connections to vpn source 1 (301) and vpn source 3 (303), meaning that the given IP is listed as a known vpn by those 2 data sources. No other known risk factors for the given IP were found. This reduces the risk score calculation down to only considering the IP score 330. In step 630, the calculation aggregates the raw results from the vpn data sources 301, 303 indicated by the results of the graph queries. Vpn data sources 301, 303 provide a true/false value depending on whether the given IP address is known to be a vpn by the individual vpn sources. For the purpose of aggregating these results mathematically, we convert true values to 1 and false values to 0. Vpn signal 302 provides a false signal, yielding a value of zero. The scoring system assigns a configurable weight ranging from 0 to 1 (0-100%) to each data source. As shown in FIG. 3C, weight 304 of 1 is assigned to vpn signal 301, and weight 306 of 1 is assigned to vpn signal 303. To calculate the combined vpn score (315), each raw vpn signal (301, 302, 303) is multiplied by its corresponding weight (304, 305, 306) and the results are summed (313) to get a combined vpn risk signal score (315):

$$vpn_{score} = \sum_{n=1}^{3} \text{weight}_{source,n} \cdot source_n$$

The combined vpn risk signal score (315) in this example is 2. The next stage in the calculation, step 640, is to compute the IP category score (330) by aggregating the weighted risk signal scores:

$$\text{score}_{category,ip} = \sum_{n=1}^{ip_{signals}} \text{weight}_{ip\,signal,n} \cdot ip\,\text{signal}_n$$

As illustrated in FIG. 3B, there is only a single ip signal providing any contribution, vpn 315. The other ip signals (deny 316, tor 317, bot 318, abuse 319, and fraud 32) are zero. The summation is reduced to the vpn score (315), 2 in this example, and multiplied by the configurable weight (of 1) for vpn signal 321, so the IP score 330 for this example is 2.

In the next stage of the calculation, step 650, the raw category scores (330, 350, 360, and 370) are weighed and aggregated to produce the raw risk score 384:

$$\text{risk}_{raw} = \sum_{n=1}^{4} \text{weight}_{category,n} \cdot \text{score}_{category,n}$$

As illustrated in FIG. 3A, there is only a single category that indicates any risk for the given IP address, ip (330). The final risk calculation is reduced to the raw ip score (330), 2 in this example, multiplied by the configurable weight (332) for the ip category, 100 in this example; so the raw risk score (384) is 200.

In step 660, the relative risk score is calculated from the raw risk score. The series of weighted summations in the risk calculation may produce a number in the range of 0 to some maximum (max-sum) which is determined by the number of raw signal inputs and the set of weights applied in the summations. In an embodiment, this max-sum is 4300. For the purpose of producing a number representing relative risk, a number in the range of 0 to 1 is preferred, so we apply a mapping from 0-'max sum' to 0-1. In an embodiment, the risk curve 400 illustrated in FIG. 4 can be used to map the raw risk score (410) to the relative risk score (420). For this example, the max-sum of 4300, and the risk-curve 400, a raw risk score of 200 produces the calculated relative risk score of 0.9 (430) . . . . For ease of computation, in an embodiment the risk-curve 400 is partitioned into intervals (over each of which the curve is assumed to be linear) for purposes of computing the relative risk score for a given raw risk score. For example, for risk values between 100 and 200 may be linearly mapped to the interval between 0.8 and 0.9.

In an embodiment, the risk score can be mapped to a relative risk score using any method that expresses the client's evaluation of authentication risk. For example, assume that the client determines that its risk threshold is 0.8, i.e., any likelihood score less than 0.8 is deemed "risky," and that a single known risk factor is sufficient to justify a determination of "risky." If all signal weights are maxed out at 100, a single positive risk signal should result in a raw risk score of 100, and the risk curve should map a weighted risk score of 100 to a relative risk score (likelihood) of 0.8. Positive contributions from other risk signals would simply make the item more risky.

In the above discussion of step 630, FIG. 3C showed how binary raw vpn signals 302, 303, and 303 could be processed to produce a vpn risk signal (315). In an embodiment, some raw signals may provide numeric values rather than binary.

Figure 5A:
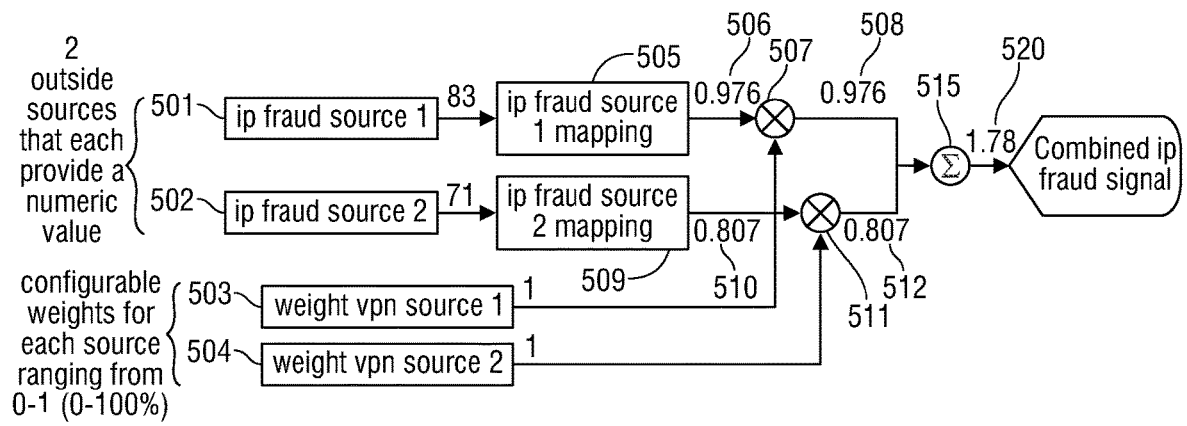
FIG. 5A illustrates an exemplary processing of raw numeric signals to create an alternative exemplary risk signal score.
Figure 5B:
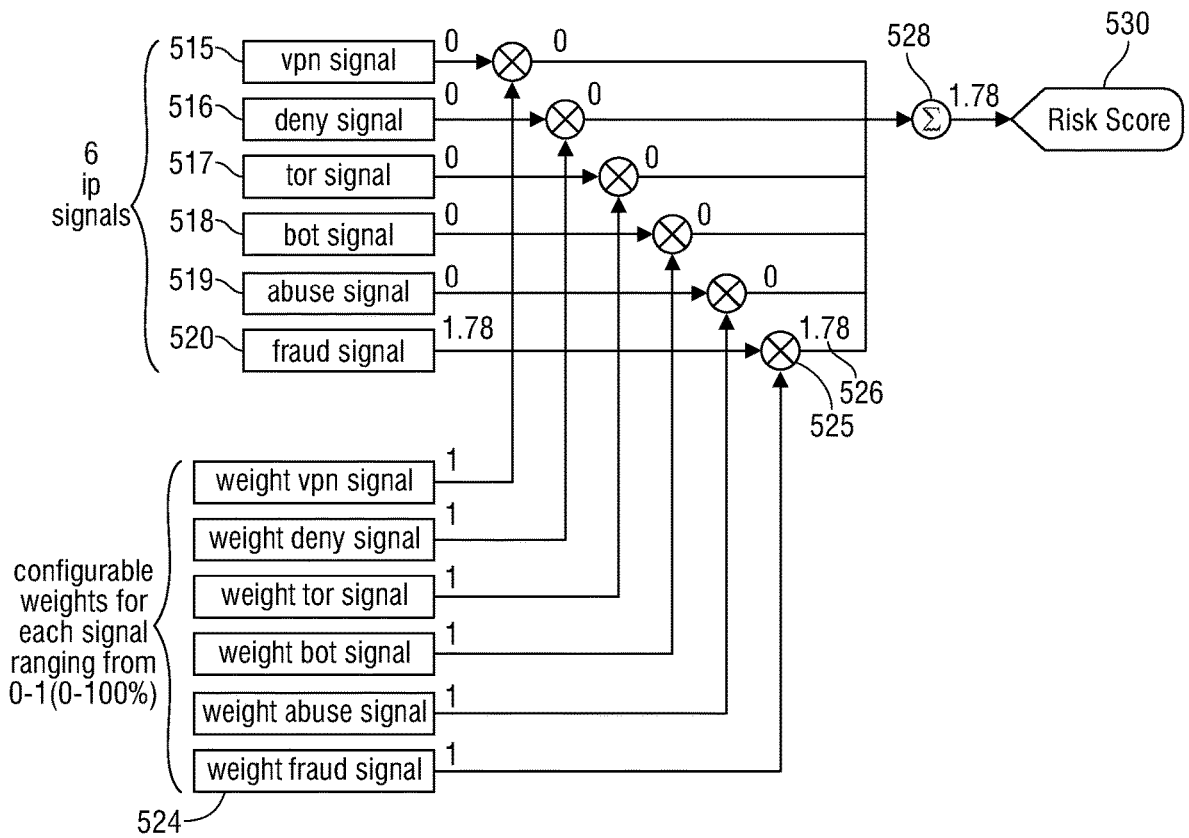
FIG. 5B illustrates an alternative exemplary aggregation of weighted risk signal scores.
Figure 5C:
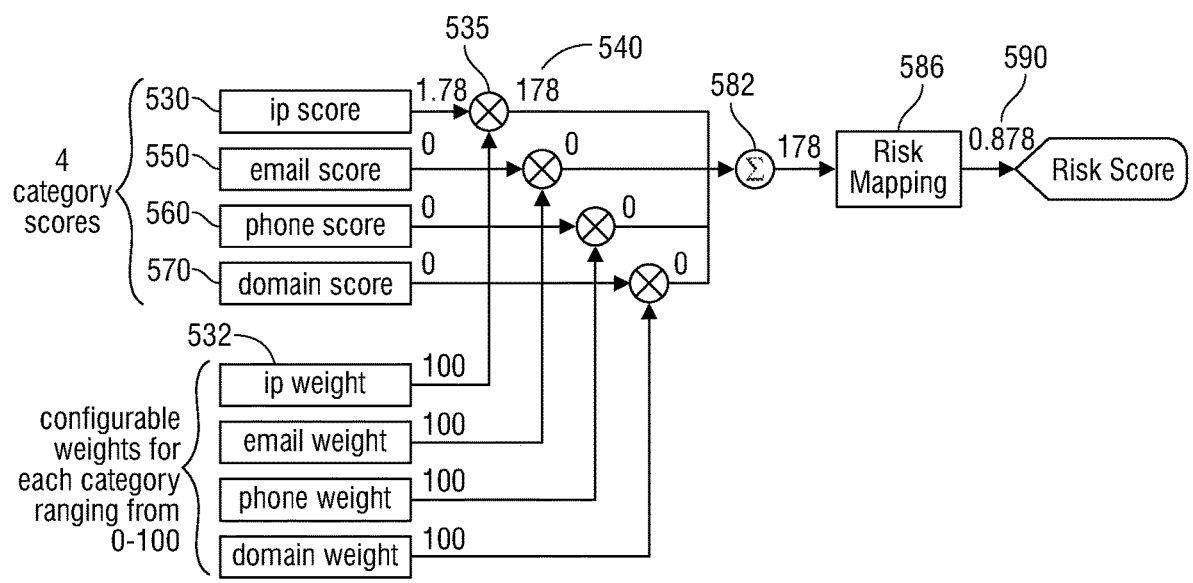
FIG. 5C illustrates an exemplary aggregation of category scores in an alternative exemplary computation of a raw risk score.

FIGS. 5A-5C illustrate an exemplary embodiment of processing numeric signals to produce a risk signal. As before, the system in the exemplary embodiment executes a series of queries looking for relationships that would indicate risk of the given ip. As shown in FIG. 5A, the results find 2 fraud scores (83 and 71) for fraud score signals (501, 502) and no other known risk factors. These fraud scores represent a fraud rating for the given ip address according to the sources of the fraud scores. Each fraud score source has its own numerical definition of risk. For example, ip fraud source 1 (501) is 0-100 with 85+ indicating risk; ip fraud source 2 (502) is 0-100 with 70+ indicating risk. This is the equivalent of one source measuring in lbs and another measuring in kg. The sources should be mapped to the same 'unit' or range.

In an embodiment, a specific mapping function for each source is used to map the source's numeric value into a range of 0 to 1. For fraud source 1 (501), the raw source value is multiplied by 0.011765 (505) which maps 85 (their definition of risk) to 1. The resulting value for fraud source 1 (501) is 0.976 (506). For fraud source 2 (502), a different technique (509) maps the range 0 to 70 to 0 to 0.8 and the range 70 to 100 to 0.8 to 1.0. The resulting value for fraud source 2 (502) is 0.807 (510). Each source mapping is specific to the source. The computed values (506, 510) are multiplied by their weights (503, 504) and summed (515) to produce a combined fraud score risk signal (520) of 1.78 when using a weight of 1 for each source.

The next stage will calculate the ip score (530). As shown in FIG. 5B, fraud signal (520) is the only risk signal contributing to the ip score (530). Assuming a weight (524) of 1 for the fraud signal (520), the ip score (530) is calculated to be 1.78. As shown in FIG. 5C, we aggregate all the weighted category scores (530, 550, 560, 570) to calculate the raw risk score (582). The email, phone, and domain category scores (550, 560, 570) contribute zero, and with a weight (532) of 100, the raw risk score (582) due to the ip score (530) is 178. Mapping the raw risk score (582) of 178 to the risk-curve 400 (FIG. 4), the resulting computed risk score (590) is 0.878.

The foregoing discussion described an example of computing a raw risk score based solely on the ip score category. In a similar manner, a raw risk score can be calculated from other categories of signals (email 350, phone score 360, and domain score 370), alone or in combination with each other.

The foregoing discussion also described examples of computing ip category score 330 based on vpn risk signal (315) and fraud risk signal (320). In a similar manner, the other category scores (email 350, phone score 360, and domain score 370) can be computed by aggregating other weighted risk signals.

Exemplary risk signals that can be weighted and aggregated to make the email score 350 include: leaked, pwned, invalid, suspect, abuse, generic, honeypot, and deny.

Exemplary risk signals that can be weighted and aggregated to make the phone score 360 include: abuse, risky, and invalid. The "invalid" signal determines if a phone number is valid based on the assigned numbers available to carriers in the country of the number. The "risky" signal determines if a phone number is temporary and expires after a certain period of time. The "abuse" signal determines if an account's phone number is reported as abuse on public blacklists.

Exemplary risk signal types that can be weighted and aggregated to make the domain score 370 include: suspect, spam, parked, malware, phish, and deny.

The naming, enumeration, description, and listing herein of raw signals, risk signals, signal categories, and risk identifiers does not limit the scope of the invention. The scope of the invention includes other types or sources of raw signals, other types or sources of risk signals, other categories of signals, other risk identifiers, different numbers of raw signals or risk signals, and any combination or permutations thereof, whether or not expressly described.

Embodiments of the invention permit incorporation of the client's own data into this data algorithm that can be categorized and tuned. The system allows the client to insert its own internal data about an identifier along with all the data that we curate. These data signals can all be tuned together to still drive towards a single consensus. A customer can provide its own raw signals, risk signals, or category signals, to include in computing raw risk.

Figure 12A:
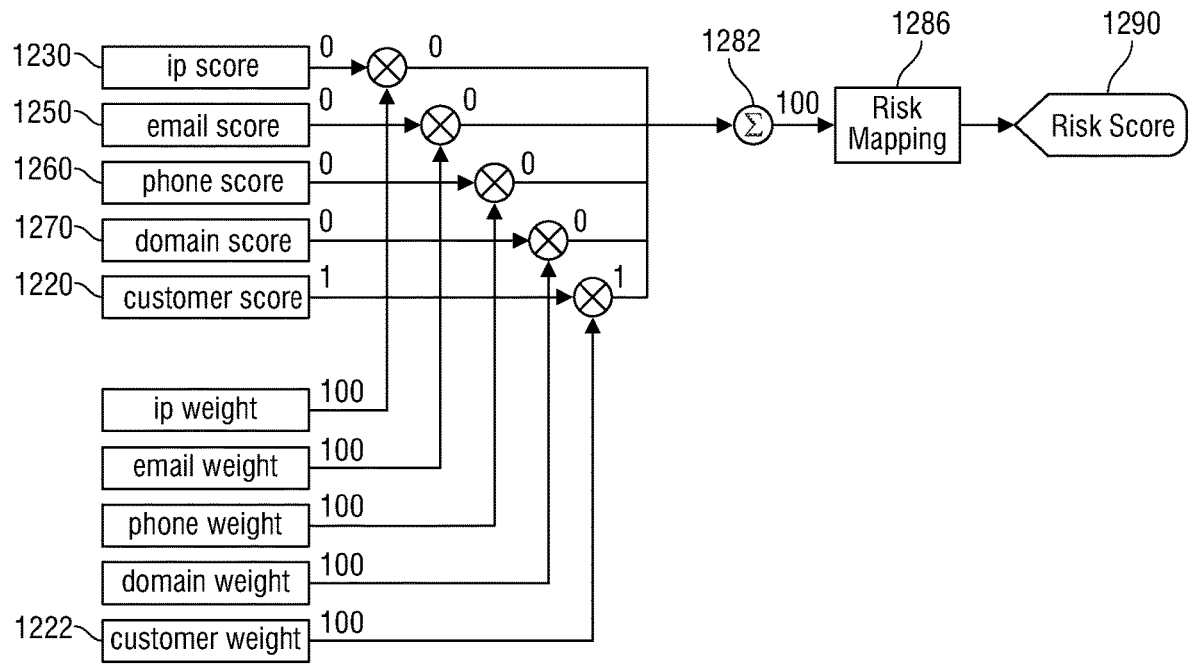
FIGS. 12A and 12B illustrate an exemplary method of aggregating user-defined signals into a raw risk score.
Figure 12B:
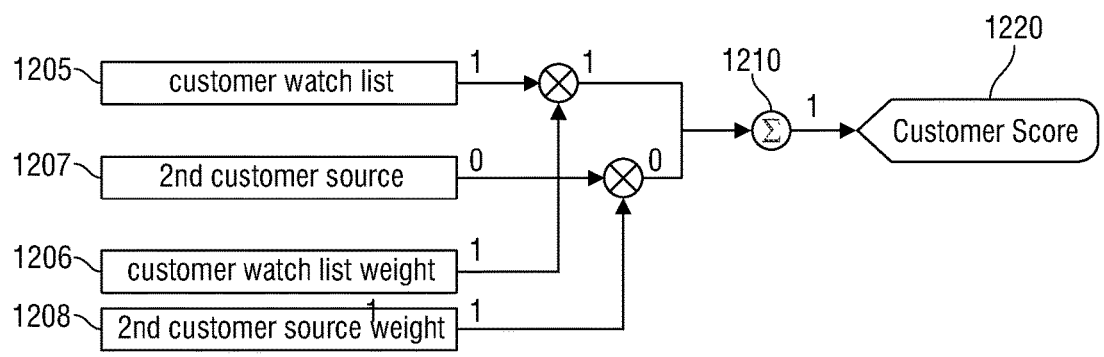

FIGS. 12A and 12B illustrate an exemplary embodiment of a method of aggregating client-defined signals into a raw risk score. In an embodiment, the process of computing the raw and relative risk scores is identical to the process shown in FIGS. 3-3C, 4, 5A-5C, and 6, except that customer-specified data sources provide an additional risk signal. FIG. 12B shows two customer data sources: customer watch list 1205 and a second customer source 1207. In this example, the risk indicia is a phone number, and the watch list signal 1205 returns a value of 1 for the client-specified phone number, i.e., the phone number is on the customer's watch list. The phone number is not included in the customer's second source 1207. The weight 1206 assigned to watch list 1205 is 1, and after weighting and summing the customer signals (1210) the resulting customer score value (1220) is 1. FIG. 12A shows, in addition to the signal categories discussed above (ip 1230, email 1250, phone 1260, and domain 1270), a category score 1220 for customer data. Customer data category score 1220 is 1, and multiplied by the weight (1222) value of 100 assigned to customer signal 1220, the weighted customer signal is 100. The other categories do not contribute any value to the risk calculation; in this example, the phone number matches the customer's watch list but does not show up in any of the other authentication risk data sources. After summing and aggregation of the weighted signals (1282), the raw risk score is 100, which can be mapped to a weighted risk score 1290 as discussed above.

Here are some examples where a customer could benefit from incorporating its own risk data signals or data sources. (1) The customer may already have its own internal store of risk scores or third party risk scores (e.g., based on user behavior) in its application. (2) Internal risk scores maintained by the customer can be merged with other or external signals and intelligence. (3) Customer-specific data may supply context to make better-informed scores. (4) The customer can identify devices already registered on its corporate network or issued and controlled by the company via its mobile device management processes. (5) The risk item corresponds to a user in a special user group, e.g., contractor, executive. (6) The customer may have helpful metadata, e.g., how long the customer's user has had an account; (7) The customer may already have biometric data for users. (8) The customer may have its own multi-factor authorization policies for its users.

In an embodiment, the signal data is stored in a graph database (or database system) 140 (FIG. 1). A graph database is optimized for storing and querying items of information and the multiple relationships between them. Our implementation stores any risk indicia (e.g., ip, email, domain, or phone) that we encounter as well as the outside data sources that provide the signal data. When a new piece of signal data is received, we store that as a relationship between the data source and the ip, email, domain, or phone on which the signal is reporting.

In an embodiment, graph database 140 (FIG. 1) is a directed graph database hosted on a Neo4J graph data platform. It is written in the Java language, so it is platform independent. Nodes represent risk items (e.g., ip, email, phone, and domain), data sources, and lists. A list is provided by or can be extracted from a data source and contains any risk items that the data source considers 'risky' under the given criteria for that list. For example, an OSINT data provider provides a vpn list that includes ip addresses that are known to be vpns. Another list provided by them is a list of internet domains known to be spam generators. A data source node is linked to the lists it provides. We call these relations 'Sourced_By', so the 'list is sourced by the given data source'. If a risk item is on a list, the graph database represents this connection as a link that is called 'Listed_By'. So, in linguistic terms, a risk item is 'listed by' a list that is 'sourced by' a given data source. In an embodiment, when we integrate a new data set, we create a new node to represent the data source as well as a new node for each list provided by that source. Over time, we will query the new source for info regarding risk items as we encounter the items. When the data source indicates a particular item, such as an ip address, is on a list, say an open source listing of IP addresses on vpns, we will add the 'listed by' relation between the corresponding node for the list and the ip address.

Figure 13:
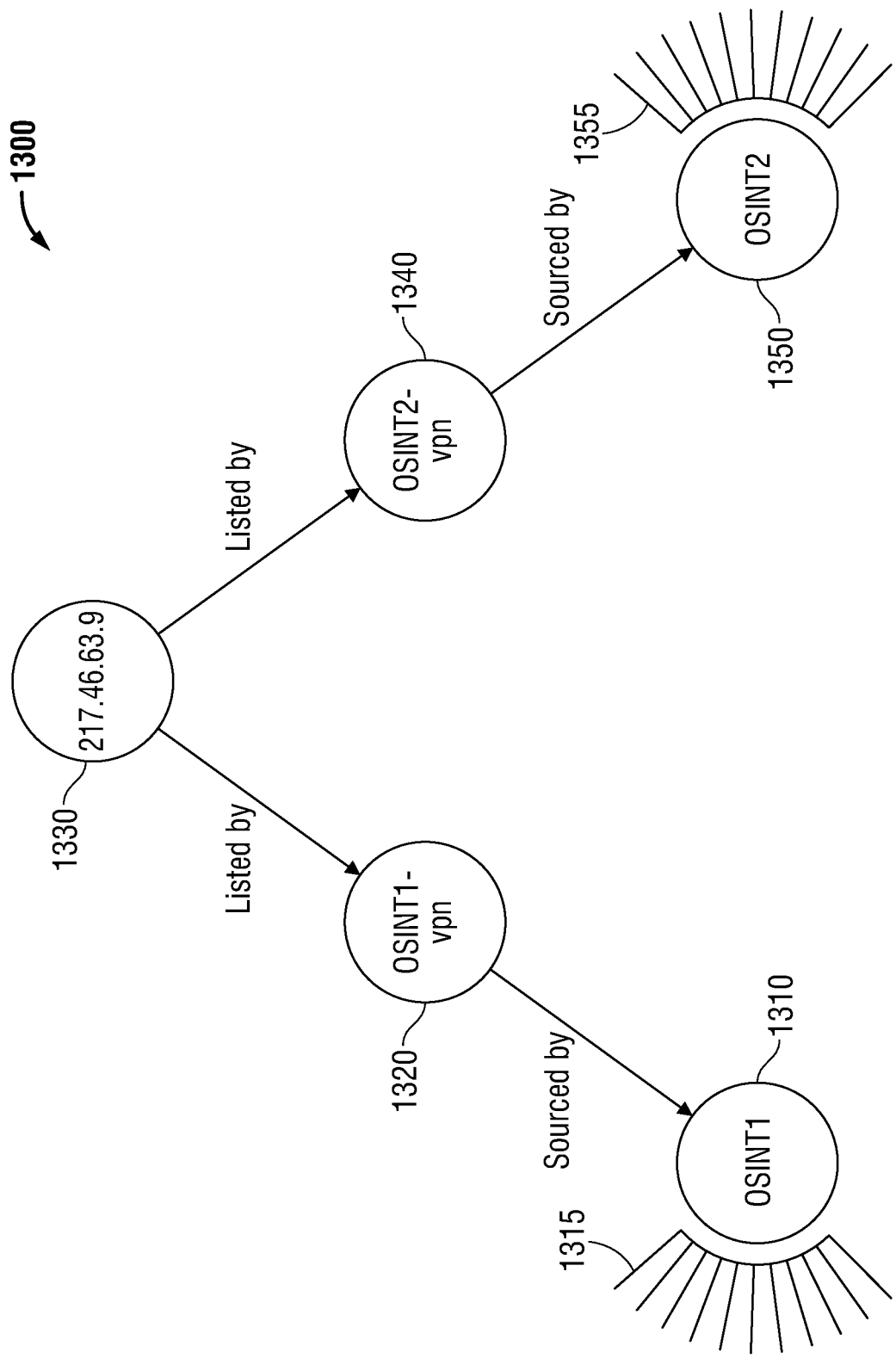
FIG. 13 illustrates an exemplary subgraph of a graph database.

The vpn example shown in FIG. 3C included an ip that was on two vpn lists: one sourced vpn OSINT source 1 (302) ("OSINT 1") and the other sourced by a second OSINT vpn source (303) ("OSINT 2"). FIG. 13 illustrates an exemplary subgraph corresponding to that example. In FIG. 13, nodes 1310, 1350 are data sources, nodes 1320, 1340 are lists, and node 1330 is an exemplary risk item (e.g., an ip). The lines 1315, 1355 extending off the left and right from nodes 1310, 1350 illustrate other lists provided by those sources. In an embodiment, numerical attributes provided by data sources, such as the fraud scores (501, 502) shown in FIG. 5A, can be stored inside the node.

Now described are exemplary embodiments of methods of computing a Likelihood. Likelihood can be evaluated to look for circadian rhythms, anomalies, and other patterns (or lack thereof) that can be correlated to authentication risk. Likelihood is calculated using many raw signals across one or more categories over time. Likelihood can be used to determine whether or not an identity which is trying to gain access to a resource should be trusted or not guiding further automated decisions. If risk is the measure that a given risk authentication datum (e.g., ip, email, phone, or combination) has some kind of 'bad potential', i.e. is 'risky', in the embodiments described herein, Likelihood is the measure that the given risk authentication data (ip, email, phone, or combination) is low-risk and stable, i.e., not risky over time. There is a logical inverse to the relationship. It can also be said that "Likelihood is a measure of 'anti-risk' over time.

Figure 7:
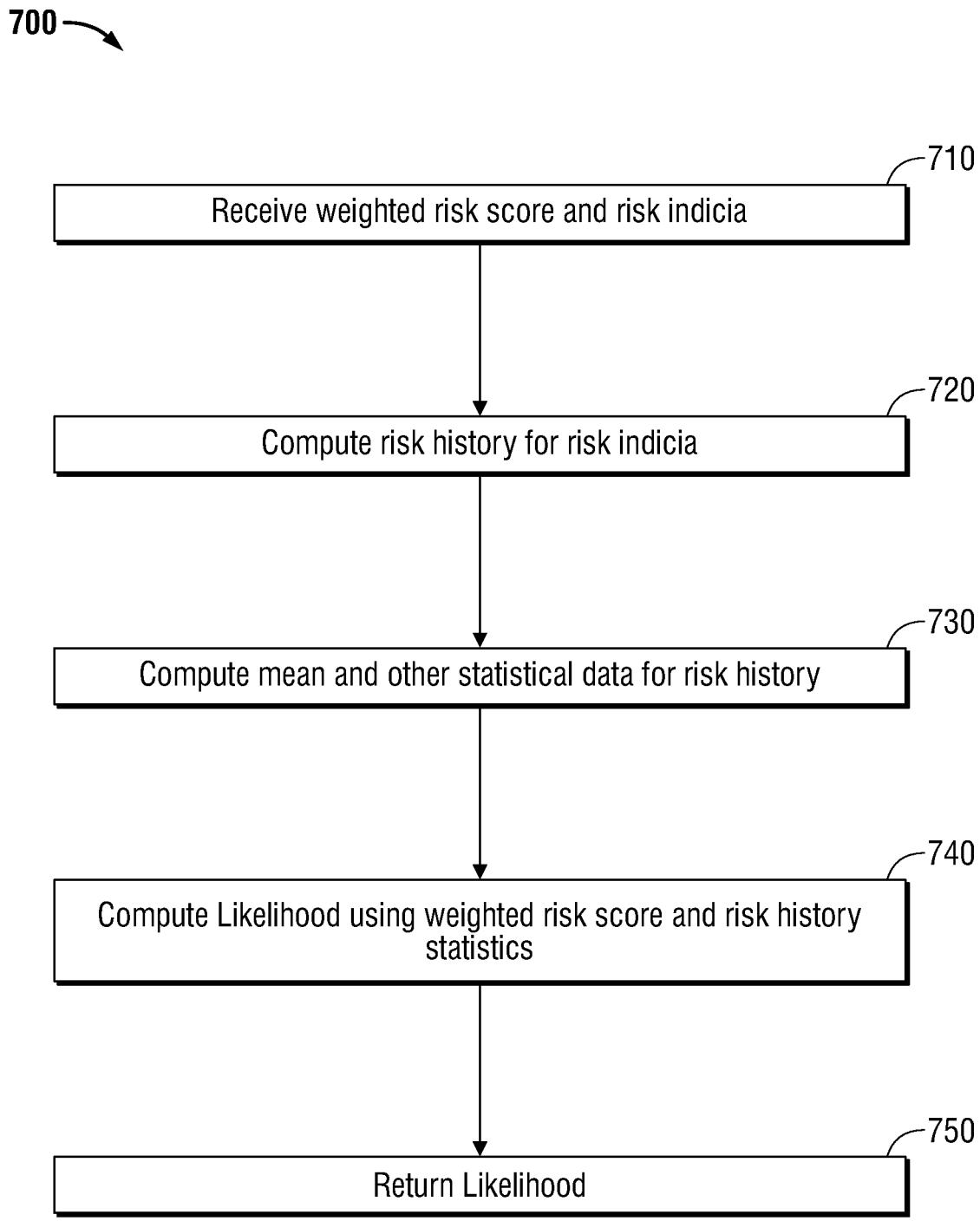
FIG. 7 illustrates an embodiment of an exemplary method of computing a likelihood score.

FIG. 7 illustrates an embodiment of computing an exemplary Likelihood (or anti-risk score) from a weighted risk score. Likelihood can be loosely defined as being related to the 'risk' over a span of time. In step 710 (FIG. 7), the weighted risk score is computed (as in the embodiments described above). Since risk is internally calculated on a scale from 0 to 1, the 'anti-risk' of a given combination is:

$$\text{anti-risk}=1-\text{risk}$$

In step 720, the risk history associated with the weighted risk score is determined. Now, to look at risk over time, we need a history of the risk for the given combination. In a current embodiment, the historical look back period is the past 7 days. In another embodiment, the historical look back period is configurable.

Using the risk history, we calculate the basic statistics of mean and standard deviation for risk:

$\mu$ and $\sigma$

The statistics (mean and std dev) for a given instance are computed using previous risk values computed for the values in a given request. For computational efficiency, the mean and standard deviation are computed using the most recent values within the historical look back period. The time period can be changed if a longer or shorter span of time provides better likelihood estimations. If there is no history, we cannot produce any statistics and, therefore, cannot calculate a likelihood value.

In step 730, we then determine how far the current risk is from the historical mean, μ, and call that 'deviation from mean', Δ:

$$\Delta = |risk - \mu|.$$

It's less important whether the risk is above or below the mean; the size of the deviation is what is important, so we use the absolute value of the difference between them. In step 740, the Likelihood is computed by starting with the current 'anti-risk' and weighting it by the 'deviation from mean':

$$L = 1 - risk/1 + \Delta$$

In other words, for a given risk, the expected likelihood decreases as risk gets farther from the historical mean of risk.

Some examples: Example 1: if, for a given combination, the risk never changes, the deviation, Δ, will always be zero and the likelihood will always be equal to the 'anti-risk'. Example 2: Same as above, but if the risk is always 0, the likelihood will always be 1. Example 3: If risk is 1, likelihood will be 0 regardless of history. Example 4: If risk has been relatively stable but then suddenly changes; the likelihood will decrease over time (as long as the risk deviates greatly from the mean). Example 5: in the converse of Example 4, if risk has been relatively unstable, but begins to stabilize, the likelihood will increase over time (as long as risk stabilizes). Example 6: If risk has been stable at 1 for some time, the mean will also be 1. If the risk suddenly swings to 0; the deviation, Δ, will be 1 and the likelihood will be 0.5.

Example 6 demonstrates an aspect that may be tuned. Since deviation, Δ, is in the range 0 to 1, Likelihood will never be less than ½ of 'anti-risk'. In an alternative embodiment, a weight is added to the deviation, so that the calculation looks like:

$$L = 1 - risk/1 + a \cdot \Delta, \text{ where } a > 1$$

In another alternative embodiment, the standard deviation of the risk could be added as another factor:

$$L = 1 - risk/1 + a \cdot \Delta + b \cdot \sigma, \text{ where } a \text{ and } b > 1$$

Figure 15:
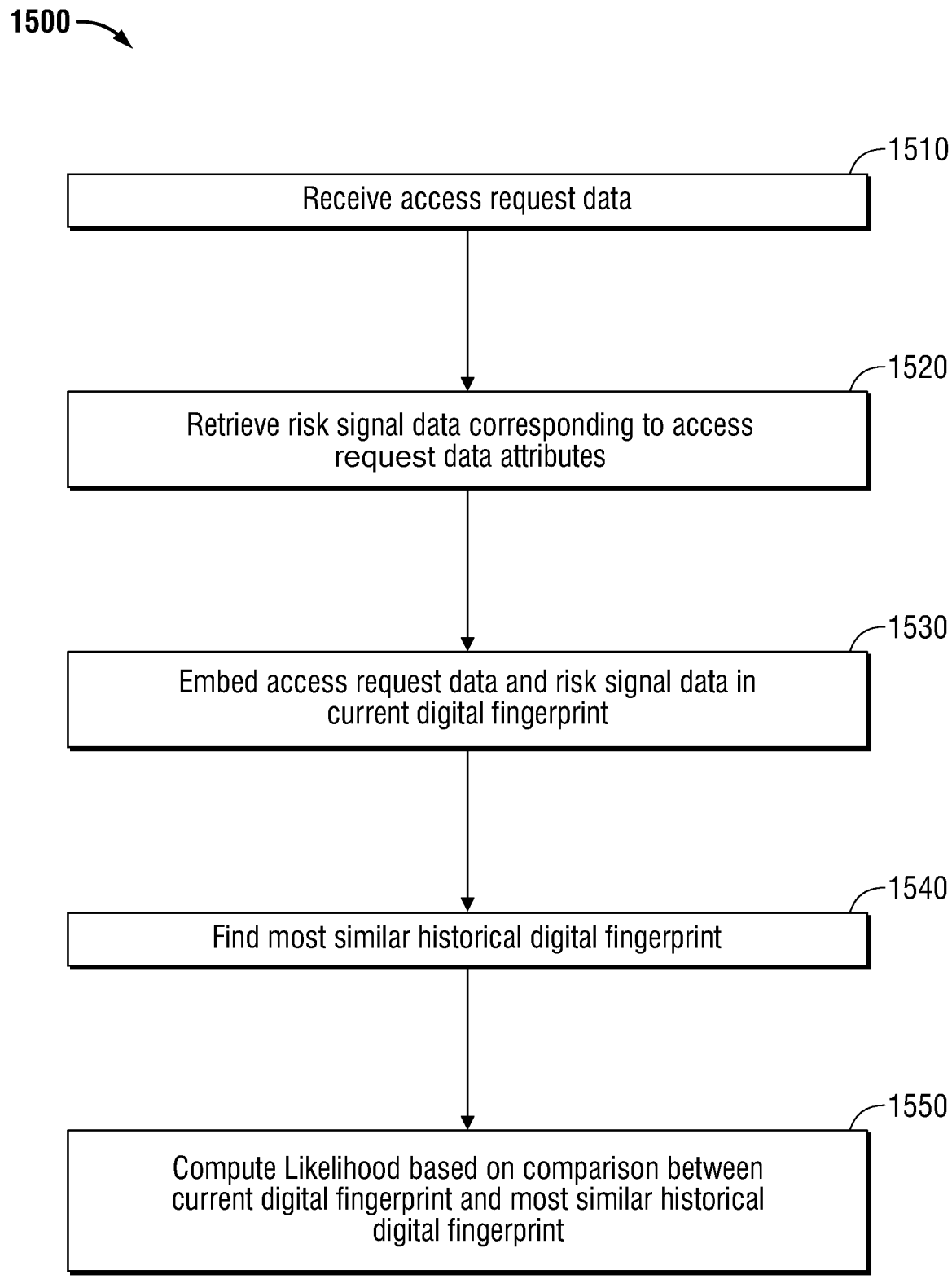
FIG. 15 illustrates an alternative embodiment of an exemplary method of computing a likelihood score.

FIG. 15 illustrates an alternative embodiment of an exemplary method of computing a likelihood score, or Likelihood, in which Likelihood can be loosely defined as being related to the behavior of the initial OSINT signals over a span of time.

In step 1510, access request data (or authentication risk data or context data) relating to an access request are received. In an embodiment, access request data attributes may include a phone number, ip, and email address. In step 1520, OSINT and other external risk signal data corresponding to the data attributes in the access request data is retrieved. In an embodiment, the OSINT or other external risk signal data is retrieved from the graph database.

In step 1530, the access data and OSINT and other risk signal data are embedded, in an embodiment, into a high-dimensional vector format. In an embodiment, the risk authentication data and signals are embedded in a high dimensional vector representation using feature hashing (or "the hashing trick" in the machine-learning space), which can be used to convert signals with categorical text data with high cardinalities into a feature vector of arbitrary dimensionality. In alternative embodiments, other embedding techniques may be used in combination or in the alternative to the hashing trick, including feature embedding, where the semantics of the words are also captured, and one-hot encoding for low cardinality signals. This vector is the current digital fingerprint that can be matched against others to determine Likelihood.

In step 1540, the high-dimensional vector (digital fingerprint) is searched against the database of historical digital fingerprints for the user identity matching the access request data. In an embodiment, the database of historical digital fingerprints is database 120 (FIG. 1). If there is no history, we cannot find any similar fingerprints and, therefore, cannot calculate a Likelihood value. In an embodiment, an approximate nearest neighbor algorithm is used to determine the historical digital fingerprint that is most similar to the current digital fingerprint for the user identity based on Euclidean distances between the current vector and all historical vectors for the user identity.

In step 1550, the Likelihood is computed by determining how far the current fingerprint deviates from the most similar one from history based on distance:

$$L = 1/1 + distance$$

Figure 9:
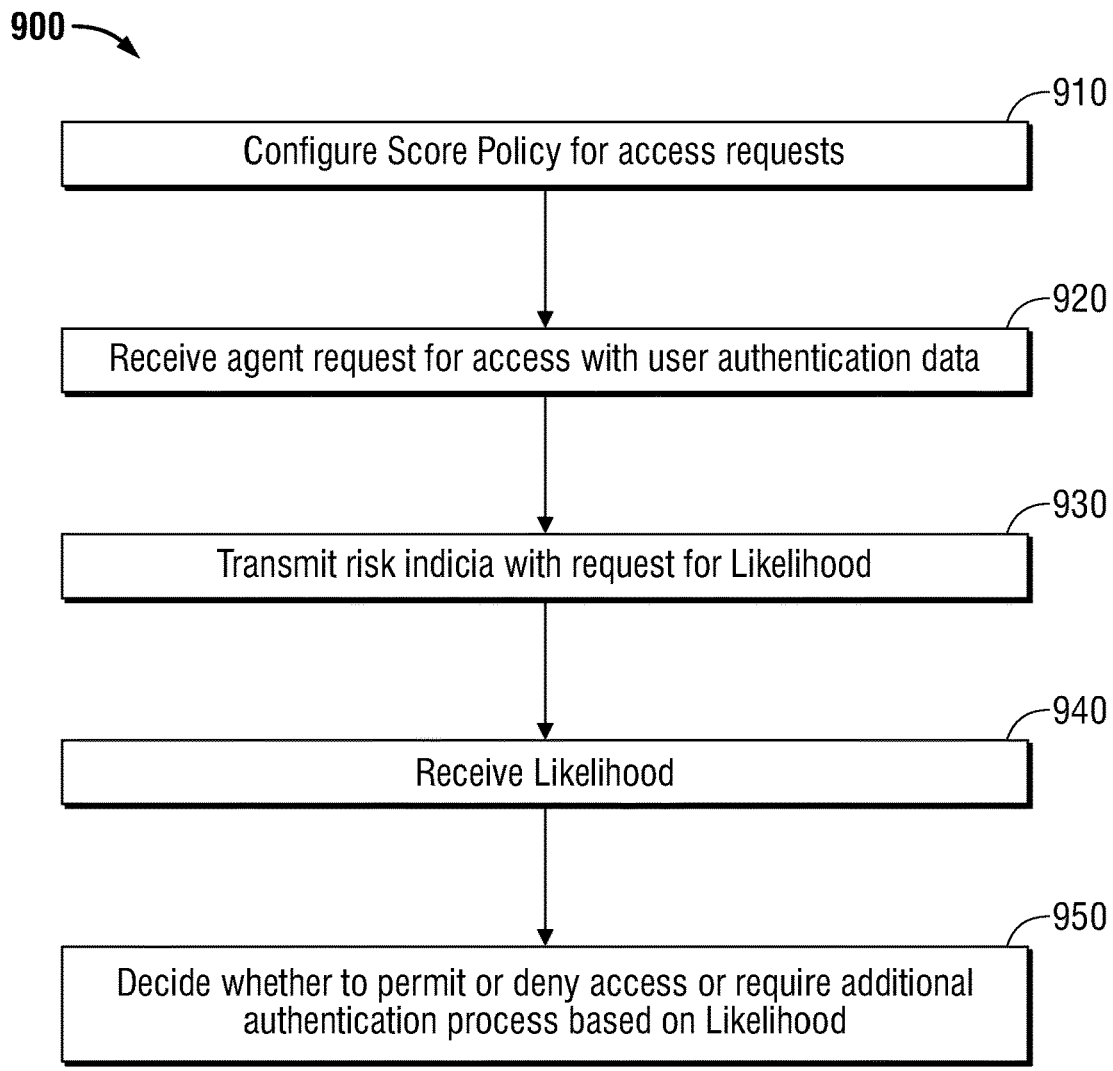
FIG. 9 illustrates an exemplary method of using a likelihood score.

FIG. 9 illustrates an exemplary embodiment of a method 900 by which an authenticator can use a Likelihood. In step 910, an authenticator can configure the score policy for access requests using a score policy API, as described above in connection with FIG. 11. For example, the authenticator can override default signal or category weights. In an embodiment, step 910 is optional: signal and/or category weights can be system defaults or assigned by system administration. In step 920, the authenticator receives an agent's request for access to a resource. The request includes access credentials, which preferably match those of an authorized user, and additional user authentication data. The authenticator extracts risk indicia (e.g., ip, domain, email, phone) from the user authentication data and in step 930 transmits the risk indicia to the authentication risk system API with a request for a Likelihood. In step 940, the authenticator receives a Likelihood from the authentication risk evaluation system.

In step 950, the authenticator uses the Likelihood in its own internal processes to decide whether to permit or deny the request for access or require additional authentication. For example, the authenticator could change a client process flow based on the likelihood score, for example, if the likelihood score is lower than a client-specified threshold. In the login process, the authenticator could: (1) challenge the agent with security questions or multi-factor authentication; (2) require completion of a captcha; (3) allow access based on the access credentials provided in the request; (4) invalidate the session. In a registration process, the authenticator can: (5) block a fraudster from signing up; (6) block a hacker from signing up for a new account on a game; or (7) block a terms-of-service violator from opening a new account. The authenticator can: (8) do continuous or periodic validation of the agent's identity and determine when to request reconfirmation of the agent's identity; (9) decide when and how often to invoke KYC processes; (10) determine how long to keep a session valid or invalidate a session; (11) track whether an agent has overstayed the period of free access to content (e.g., news or blog) or resource; (12) reduce registration signup fraud for "new user rewards" to prevent agents from getting duplicate benefits by creating multiple accounts; (13) reduce fraudulent pay-per-click ad spend by using DDF to identify ip and click farms that drive fake traffic to the authenticator's site.

Figure 14:
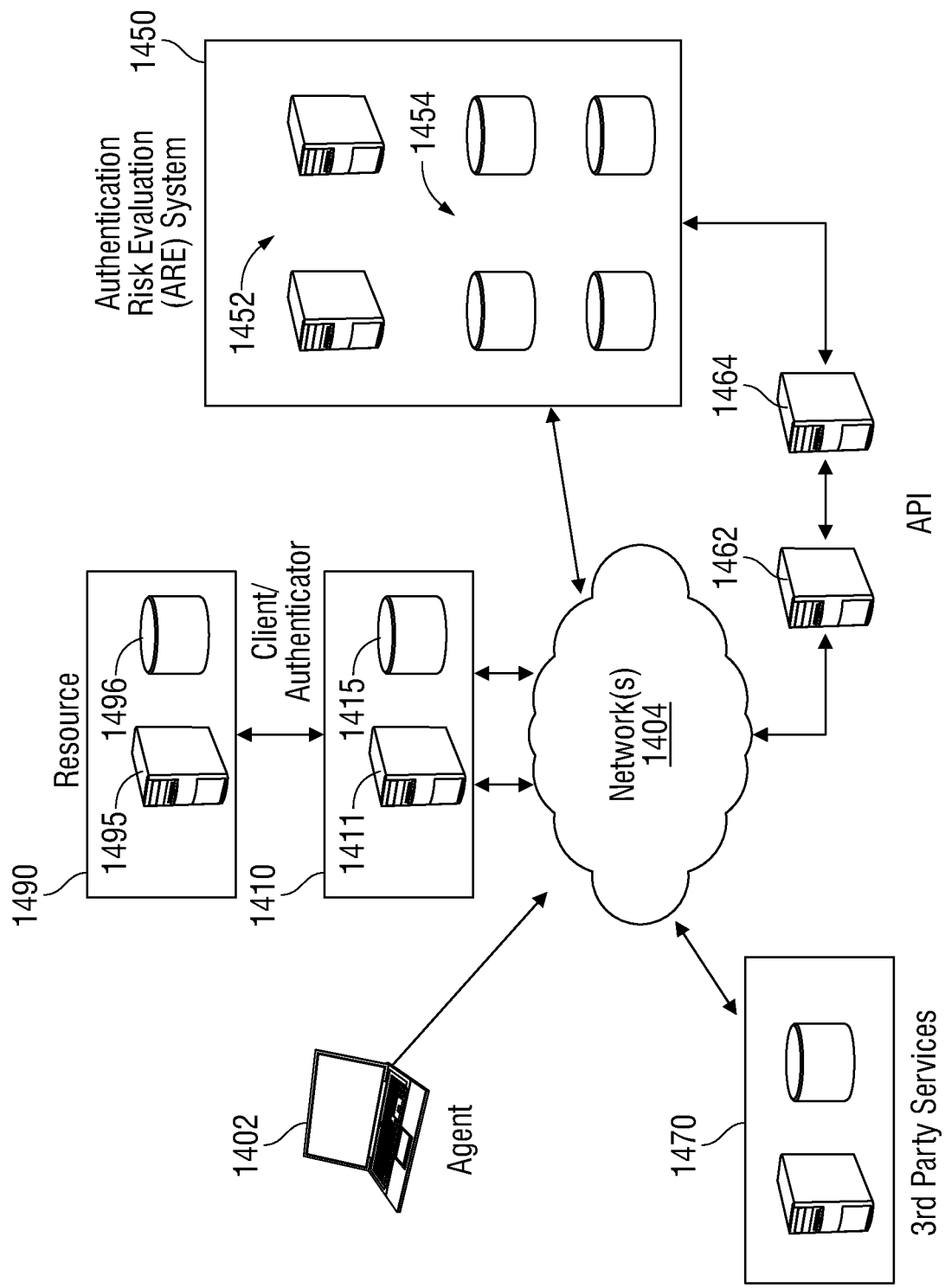
FIG. 14 illustrates aspects of an exemplary embodiment of a hardware environment.

FIG. 14 illustrates aspects of an exemplary embodiment of a hardware environment 1400 for implementing the methods and systems described here. The exemplary environment 1400 includes an electronic device 1402 by which an agent submits a request for access to a resource over a communications channel via one or more networks 1404. Examples of such client devices include personal computers, workstations, servers, cell phones, handheld messaging devices, laptop computers, tablet computers, set-top boxes, personal data assistants, embedded computer systems, electronic book readers, and the like. In an embodiment, agent device 1402 is coupled directly or indirectly, over a communications channel via for example network 1404, to a client authenticator's computer-implemented authentication system hosted on one or more computer servers 1411 included in client's computer system 1410. The authenticator's computer-implemented authentication system 1411 is logically coupled to, via for example, network 1404 (not illustrated) and controls access to a resource 1490, which includes in an example one or more servers 1495 and one or more database systems 1496 for providing resource content or services.

In an embodiment, the authenticator's computer-implemented authentication system 1411 is also logically coupled to Authentication Risk Evaluation (ARE) System 1450 over a communications channel via network 1404 directly and indirectly via one or more API computer servers 1462, 1464, including an API Gateway server and a Public API, and in an embodiment one or more web servers.

ARE System 1450 is hosted on one or more computer systems, application servers, and/or computer server systems 1452 coupled to one or more database servers, data stores, databases, and database management systems 1454. In an embodiment, ARE system 1450 includes the components shown in FIG. 1. ARE system 1450 is logically coupled over one or more communications channels via network 1404 to third party services 1470 hosted on computer systems or server systems and client data stores 1415 within client's computer system 1410.

Regarding computer systems, application servers, and/or computer server systems 1452, it should be understood that there can be several application servers, layers, or other elements, processes, or components, which may be chained or otherwise configured, which can interact to perform tasks such as hosting or obtaining data from an appropriate data store. Computer systems, application servers, and/or computer server systems 1452 may be implemented in various ways, such as hardware devices or virtual computer systems. In some contexts, servers may refer to a programming module being executed on a computer system. The computer systems, application servers, and/or computer server systems 1452 can include any appropriate hardware, software, and firmware for executing the methods and processes described herein. Operations described herein as being performed by a single device may, unless otherwise clear from context, be performed collectively by multiple devices, which may form a distributed and/or virtual system.

The computer systems, application servers, and/or computer server systems 1452 described herein may include one or more software systems, including separate data tables, data stores, databases, data documents, dynamic data storage schemes, and/or other data storage mechanisms and media for storing data relating to a particular aspect of the present disclosure. The computer systems, application servers, and/ or computer server systems 1452 described herein may also include application code software, modules, and/or logic operable, through logic associated therewith, that, when executed by one or more processes, to perform the methods and processes described herein.

The one or more database servers, data stores, databases, and database management systems 1454 include, for example and without limitation, database servers, database emulators, and SQL engines, including those commercially available from Oracle (registered trademark), Microsoft (registered trademark), Sybase (registered trademark), and IBM (registered trademark), as well as open-source servers such as MySQL, Postgres, SQLite, MongoDB, Redis, Neo4J, and any other server capable of storing, retrieving, and accessing structured or unstructured data. Database servers may include table-based servers, document-based servers, unstructured servers, relational servers, graph database servers, non-relational servers, or combinations of these and/or other database servers.

As used herein, unless otherwise stated or clear from context, the term "data store" refers to any device or combination of devices capable of storing, accessing, and retrieving data, which may include any non-transitory computer readable storage media, and any combination and number of data servers, databases, data storage devices, and data storage media, in any standard, distributed, virtual, or clustered environment.

Each computer system, application server, and/or computer server system 1452 described herein typically will include an operating system that provides executable program instructions for the general administration and operation of that server and typically will include a computer-readable storage medium (e.g., a hard disk, random access memory, read only memory, and the like storing instructions that, when executed (i.e., as a result of being executed) by a processor of the server, allow the server to perform its intended functions. The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the hardware environment 1400 in FIG. 14 should be taken as being illustrative in nature and not limiting to the scope of the disclosure. The various embodiments further can be implemented in a wide variety of operating environments, which in some cases can include one or more computers, computer systems, computing devices or processing devices which can be used to operate any of a number of applications.

Various embodiments of the present disclosure utilize at least one network 1404 that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UPnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from client devices, such as by executing one or more web applications that may be implemented as one or more scripts or programs written in any programming language, such as Java (registered trademark), Go, C, C#, or C++, or any scripting language, such as Ruby, PHP, Perl, Python, or TCL, or Net, and NodeJS, as well as combinations thereof.

The environment can include a variety of data stores and other memory and storage media as discussed above. In an embodiment, ARE system 1450 resides in a variety of locations, such as on a storage medium local to (and/or resident in) one or more of the computers or remote from any or all of the computers across the network. The information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, and the like.

Such devices also can include a computer-readable storage media reader, a communications device (e.g., a modem, a network card (wireless or wired), an infrared communication device, and the like), and working memory, as described above. The computer-readable storage media reader can be connected with, or configured to receive, a computer-readable storage medium, representing remote, local, fixed, and/or removable storage devices as well as storage media for persistently, or temporarily and/or more permanently, containing, storing, transmitting, and retrieving computer-readable information. The system and various devices also typically will include a number of software applications, modules, services, or other elements located within at least one working memory device, including an operating system and application programs. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors.

The computer-readable storage medium may be non-transitory. The term "non-transitory," as used herein, defines a characteristic of the medium itself (i.e., tangible, not a signal) as opposed to a characteristic of data storage persistency (e.g., RAM vs. ROM). In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Further, in some examples, the executable instructions are executed such that different instructions are executed by different processors. As an illustrative example, a non-transitory computer-readable storage medium may store instructions. A main CPU may execute some of the instructions and a specialized processor unit (including for example a math co-processor, a cryptographic co-processor, or a graphics co-processor) may execute other of the instructions. Generally, different components of a computer system may have separate processors and different processors may execute different subsets of the instructions.

Accordingly, in some examples, computer systems are configured to implement one or more services that singly or collectively perform operations of the methods and processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

Any computer, server, computer system, server system, data store, or database system described herein, including processors, memory, data stores, and other components, includes, and its functions may be performed in whole or in part by, a virtual computer, virtual server, virtual computer system, virtual server system, virtual data store, or virtual database system, including for example those provided by Amazon Web Services®.

In an embodiment, APIs 103 and 105 are hosted on a web server connected to a communications network, third party services 195 (FIG. 1) are hosted remotely by third parties, and the other components of the system are implemented on one or more virtual machines hosted by Amazon Web Services (AWS), e.g., virtual computers, virtual servers, virtual data stores, and virtual database systems.

Although embodiments of the present invention have been described in detail, it will be apparent to those skilled in the art that many embodiments taking a variety of specific forms and reflecting changes, substitutions and alterations can be made without departing from the spirit and scope of the inventions disclosed herein. The described embodiments illustrate the scope of the claims but do not restrict the scope of the claims.

What is claimed is:

1. A computer system comprising memory and at least one processor for quantifying identity risk for use in regulating access to online resources, comprising:
    a client-facing server system programmed to receive from a client access request data associated with an agent's request for access to an online resource using valid credentials of an authorized user and to communicate to the client an identity score, said identity score comprising a quantification of the risk that the agent is the authorized user;
    a database system comprising user data comprising historical user access data associated with a plurality of user identities;
    a plurality of data signal collector systems communicatively linked to a plurality of external identity risk data sources including at least one open source intelligence (OSINT) data source;
    a graph database system comprising continuously and automatically-updated identity risk signal data sourced from the plurality of external identity risk data sources; and
    a computer system comprising at least one processor and memory comprising executable program instructions which when executed by the at least one processor cause the computer system to compute the identity score using data comprising the access request data, historical access data associated with the authorized user, and identity risk signal data, wherein the computer system comprises executable program instructions to compute the identity score by:
    embedding identity risk signal data into a current digital fingerprint;
    retrieving historical digital fingerprints for the authorized user; and
    computing the distance between a similar historical digital fingerprint for the authorized user and the current digital fingerprint.

2. The computer system for quantifying identity risk for use in regulating access to online resources of claim 1, wherein a digital fingerprint comprises a high-dimensional vector.

3. The computer system for quantifying identity risk for use in regulating access to online resources of claim 1, wherein the computer system comprises executable program instructions to compute the identity score by:
    computing a current weighted risk score comprising the identity risk signal data;
    retrieving historical weighted risk scores for the authorized user; and
    computing the deviation from mean between the current weighted risk score and the historical weighted risk scores for the authorized user.

4. The computer system for quantifying identity risk for use in regulating access to online resources of claim 1, wherein the computer system further comprises a database system comprising client identity policy data, and the computer system is further programmed to use client identity policy data to compute the identity score.

5. The computer system for quantifying identity risk for use in regulating access to online resources of claim 4, wherein the client identity policy data comprises a client-specified signal data source or a client-specified signal weighting.

6. The computer system for quantifying identity risk for use in regulating access to online resources of claim 1, wherein the access request data comprises a telephone number, an email address, and an IP address.

7. A computer-implemented method for quantifying identity risk associated with a request for access to online resources, comprising:
    receiving from a client an identity score request comprising risk indicia associated with an agent's request for access to online resources using valid credentials of an authorized user,
        wherein the risk indicia comprises access data associated with said request for access, comprising a first access request data attribute, a second access request data attribute, a third access request data attribute, and user authentication data;
    employing an authentication risk evaluation system to use the risk indicia to compute an identity score and returning the identity score to the client, comprising:
        retrieving current first identity risk signal data corresponding to the first access request data attribute, current second identity risk signal data corresponding to the second access request data attribute, and current third identity risk signal data corresponding to the third access request data attribute;
        retrieving user historical access data associated with the authorized user; and
        computing the identity score based on data comprising the current first identity risk signal data, the current second identity risk signal data, the current third identity risk signal data, and the user historical access data, wherein the authentication risk evaluation system comprises at least one processor and a memory comprising executable program instructions which when executed by the at least one processor cause the authentication risk evaluation system to use the risk indicia to compute the identity score,
    wherein computing the identity score further comprises:
        embedding the current first identity risk signal data, the current second identity risk signal data, and the current third identity risk signal data into a current digital fingerprint;
        retrieving historical digital fingerprints for the authorized user; and
        computing the distance between a similar historical digital fingerprint for the authorized user and the current digital fingerprint.

8. The computer-implemented method for quantifying identity risk associated with a request for access to online resources of claim 7, wherein a digital fingerprint comprises a high-dimensional vector.

9. The computer-implemented method for quantifying identity risk associated with a request for access to online resources of claim 7, wherein computing the identity score further comprises:
- computing a current weighted risk score comprising the current first identity risk signal data, the current second identity risk signal data, and the current third identity risk signal data;
- retrieving historical weighted risk scores for the authorized user; and
- computing the deviation from mean between the current weighted risk score and the historical weighted risk scores for the authorized user.

10. The computer-implemented method for quantifying identity risk associated with a request for access to online resources of claim 7, wherein employing an authentication risk evaluation system to use the risk indicia to compute an identity score further comprises:
- retrieving first client identity policy data corresponding to at least one access request data attribute or the user authentication data; and
- computing the identity score based on the current first identity risk signal data, the current second identity risk signal data, the current third identity risk signal data, the user historical access data, and the first client identity policy data.

11. The computer-implemented method for quantifying identity risk associated with a request for access to online resources of claim 10, wherein the first client identity policy data comprises a client-specified signal data source or a client-specified signal weighting.

12. The computer-implemented method for quantifying identity risk associated with a request for access to online resources of claim 7, wherein the first access request data attribute comprises a telephone number, the second access request data attribute comprises an email address, and the third access request data attribute comprises an IP address.

13. The computer-implemented method for quantifying identity risk associated with a request for access to online resources of claim 7, wherein the access data further comprises a domain data attribute that is evaluated with other access data in computing the identity score.

14. The computer-implemented method for quantifying identity risk associated with a request for access to online resources of claim 7, further comprising updating the historical access data associated with the authorized user to include the first access request attribute, the second access request data attribute, and the third access request data attribute.

* * * * *